(12) United States Patent
Morita et al.

(10) Patent No.: US 7,097,126 B2
(45) Date of Patent: Aug. 29, 2006

(54) MAGNETIC TAPE CARTRIDGE

(75) Inventors: Kiyoo Morita, Kanagawa-ken (JP);
Daisuke Takahashi, Kanagawa-ken
(JP); Hideaki Shiga, Kanagawa-ken
(JP); Seiji Tsuyuki, Kanagawa-ken (JP);
Yusuke Ishihara, Kanagawa-ken (JP)

(73) Assignee: Fuji Photo Film Co., Ltd.,
Kanagawa-ken (JP)

( * ) Notice: Subject to any disclaimer, the term of this patent is extended or adjusted under 35 U.S.C. 154(b) by 0 days.

(21) Appl. No.: 11/230,736

(22) Filed: Sep. 21, 2005

(65) Prior Publication Data

US 2006/0169818 A1    Aug. 3, 2006

Related U.S. Application Data

(60) Division of application No. 10/784,963, filed on Feb. 25, 2004, which is a continuation of application No. 10/173,273, filed on Jun. 18, 2002, now Pat. No. 6,760,192, which is a division of application No. 09/701,971, filed on Dec. 6, 2000, now Pat. No. 6,680,818.

(30) Foreign Application Priority Data

Jun. 8, 1998    (JP) .................................. 10/158784
Jul. 17, 1998   (JP) .................................. 10/202497
Jun. 3, 1999    (JP) ....................... PCT/JP99/02963

(51) Int. Cl.
    G11B 23/04    (2006.01)
(52) U.S. Cl. .................... 242/338.1; 242/348; 360/132
(58) Field of Classification Search ................ 242/338, 242/338.1, 340, 342, 348, 332.4, 611, 609, 242/612; 360/132
See application file for complete search history.

(56) References Cited

U.S. PATENT DOCUMENTS

| 3,857,531 | A | 12/1974 | Jantzen |
| 4,452,404 | A | 6/1984 | Gelardi et al. |
| 4,723,731 | A | 2/1988 | Posso |
| 5,027,249 | A | 6/1991 | Johnson et al. |
| 5,299,754 | A | 4/1994 | Lackowski |
| 5,323,984 | A | 6/1994 | Lackowski |
| 5,366,173 | A | 11/1994 | Lammers et al. |

(Continued)

FOREIGN PATENT DOCUMENTS

EP        0143592 A2    6/1985

(Continued)

OTHER PUBLICATIONS

European Search Report dated Feb. 5, 2004.
IBM Tech. Disclosure XP-002099977 Mar. 1986 IBM Corporation.

Primary Examiner—William A. Rivera
(74) Attorney, Agent, or Firm—Sughrue Mion, PLLC

(57) ABSTRACT

A single reel with magnetic tape wound thereon is housed in a case. A restraining member, for restricting rotation of the reel by moving toward or away from the reel, is urged in a restraining direction by an urging member. The pushing-up portions of a releasing member are inserted into the through holes bored in the reel gear of the reel 2 so that the lower ends can abut a driving gear. The releasing member moves the restraining member in a releasing direction by moving according to the chucking operation of drive-side rotation drive means. In this manner, reel-rotation restraining means allows rotation of the reel when being used and restricts the rotation when not being used. In this construction, each of the through holes is bored between the tooth edges of the reel gear so that the releasing member can perform a reliable releasing operation.

1 Claim, 32 Drawing Sheets

| U.S. PATENT DOCUMENTS | | | | FOREIGN PATENT DOCUMENTS | | |
|---|---|---|---|---|---|---|
| 5,436,782 A | 7/1995 | Sieben | | EP | 0284687 A2 | 10/1988 |
| 5,826,811 A | 10/1998 | Melbye et al. | | EP | 0926676 A1 | 6/1999 |
| 5,893,527 A | 4/1999 | Mizutani et al. | | JP | 01294285 A | 11/1989 |
| 5,901,916 A | 5/1999 | McAllister et al. | | JP | 11-7747 | 1/1999 |
| 6,062,500 A | 5/2000 | Coles | | WO | WO 97/15925 | 5/1997 |
| 6,680,818 B1 * | 1/2004 | Morita et al. | 360/132 | | | |
| 6,760,192 B1 * | 7/2004 | Morita et al. | 360/132 | | | |

\* cited by examiner

F I G. 11
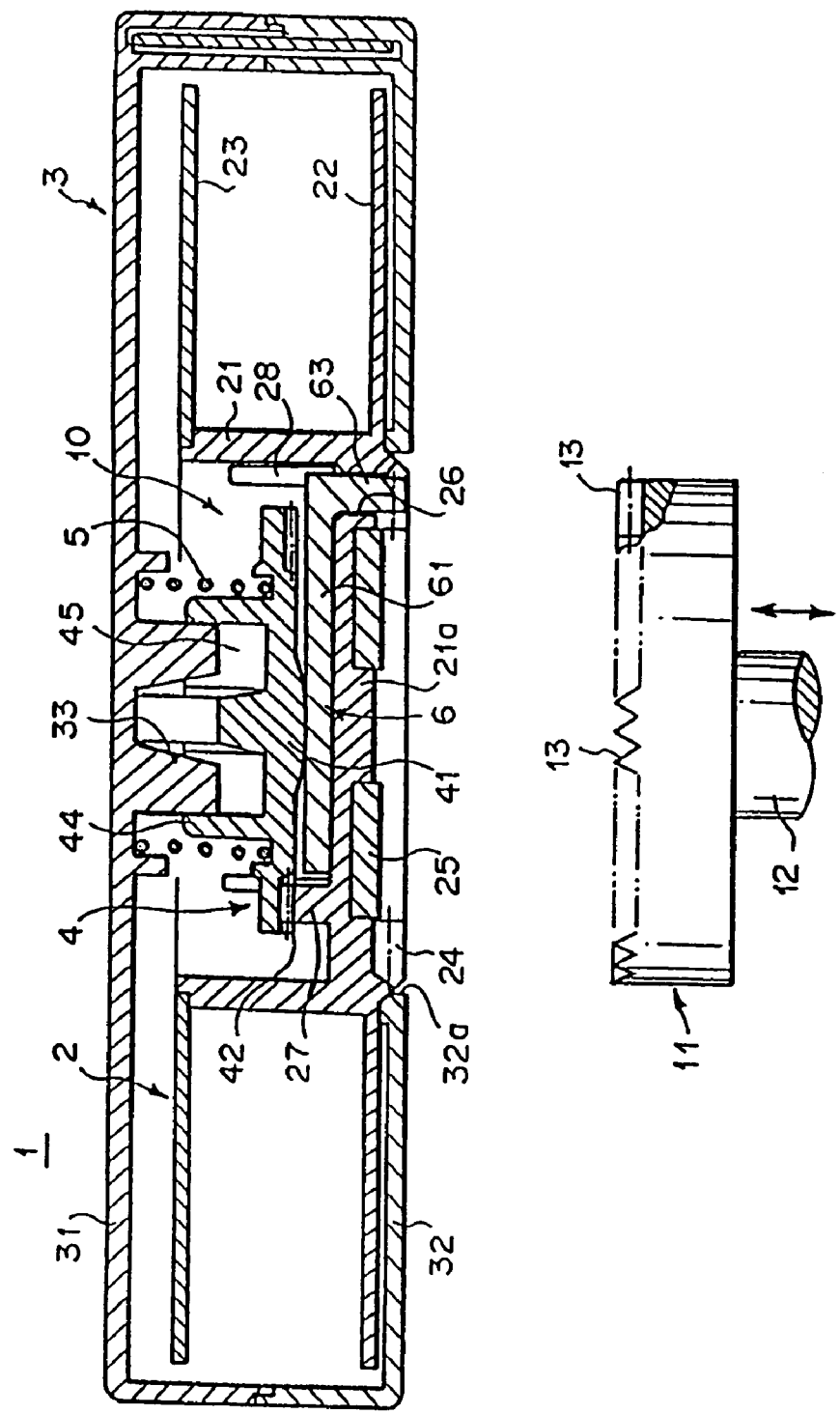

F I G. 18
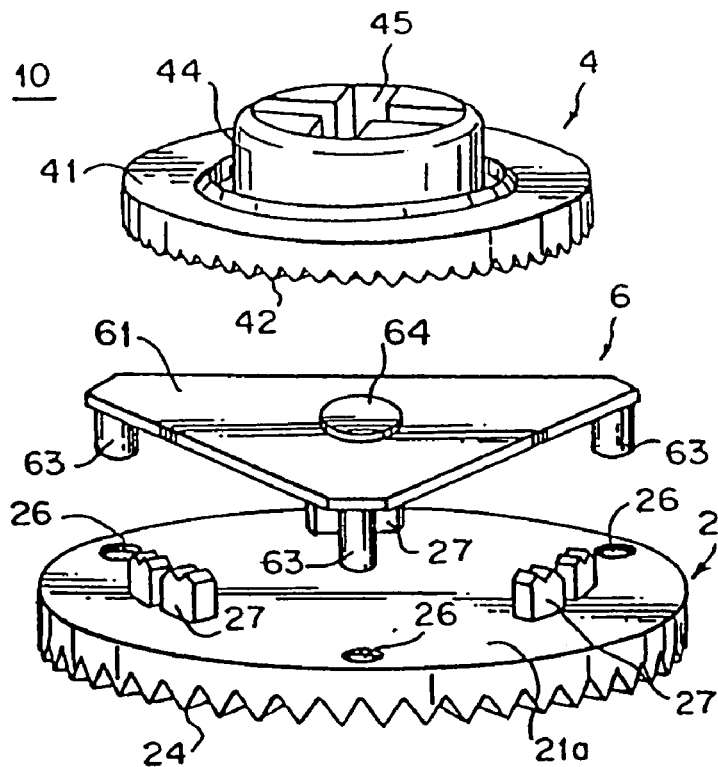
F I G. 19
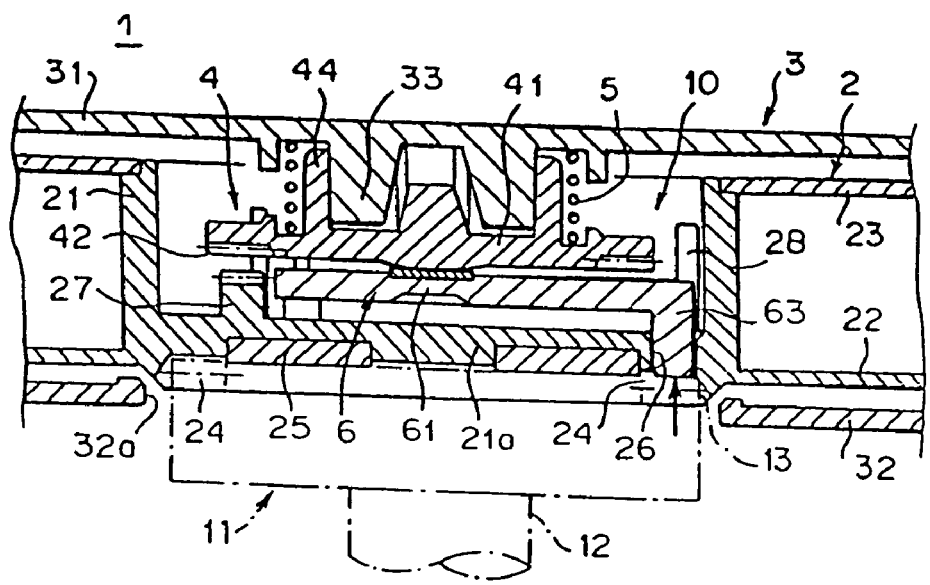

FIG. 32
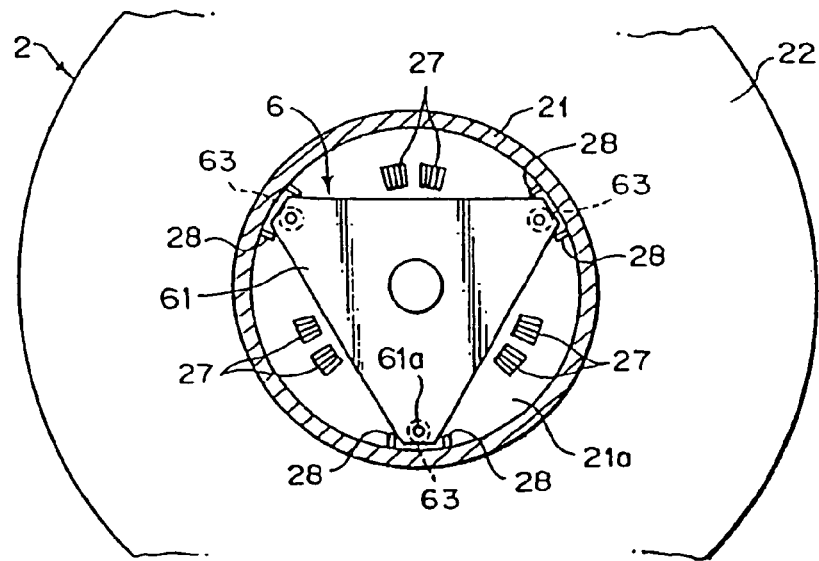
FIG. 33
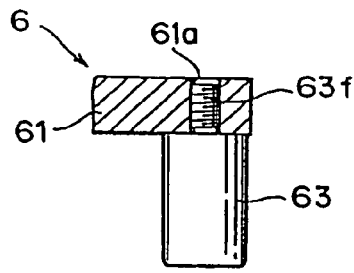
FIG. 34A  FIG. 34B
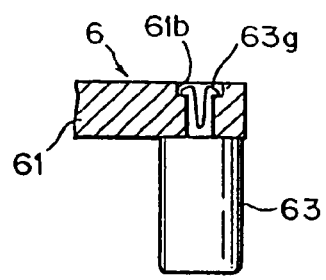 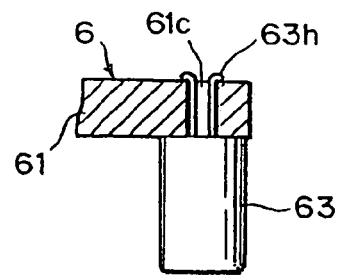

F I G. 38
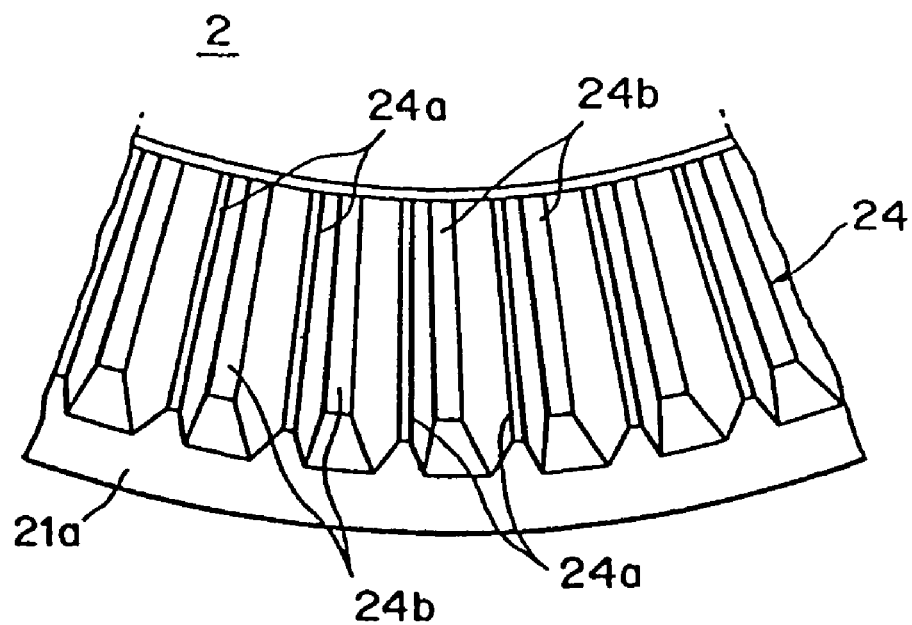
F I G. 39
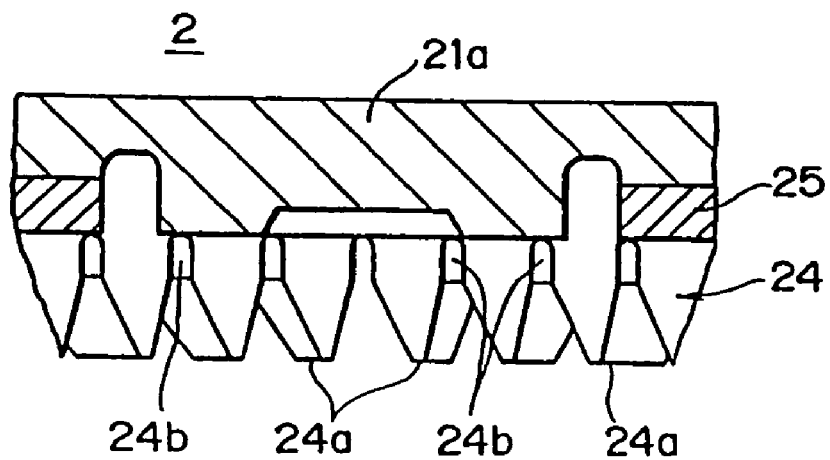

F I G. 48A     F I G. 48B
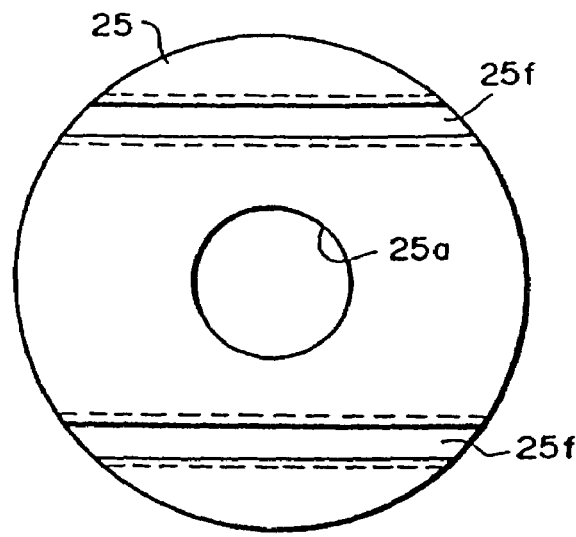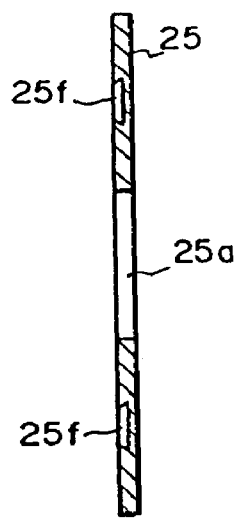
F I G. 49
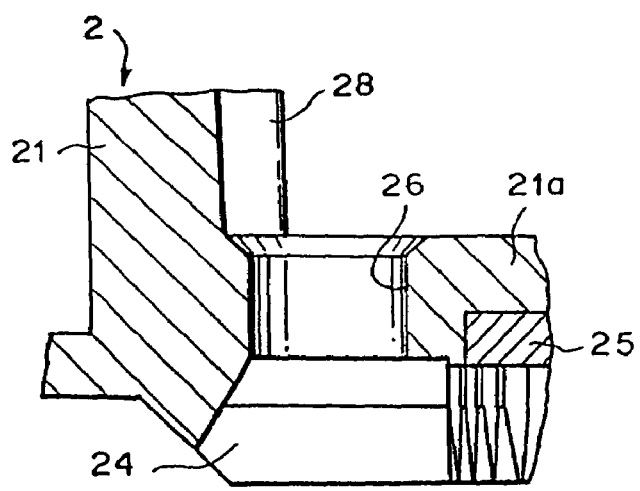

F I G. 50
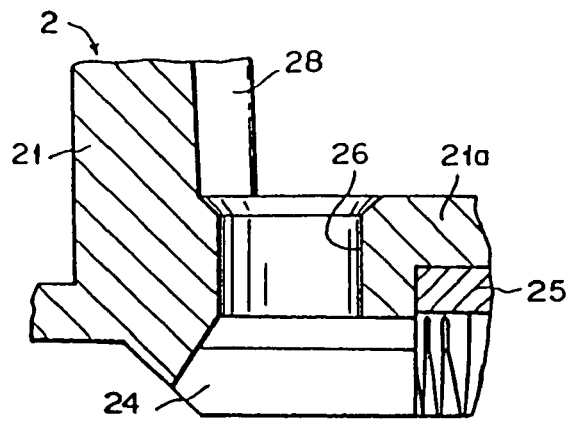
F I G. 51
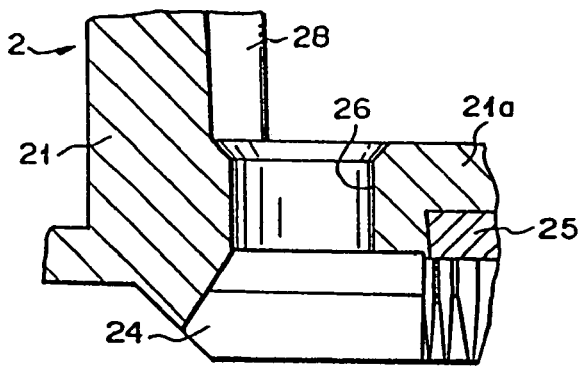
F I G. 52
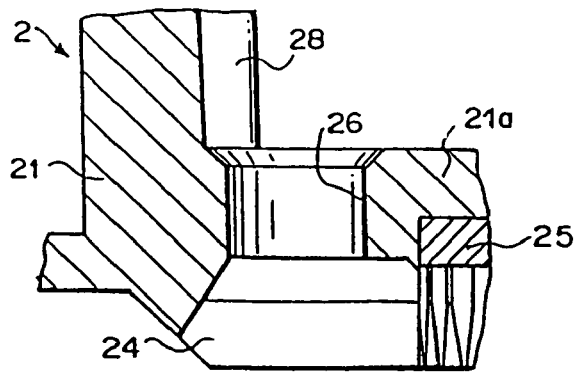

US 7,097,126 B2

MAGNETIC TAPE CARTRIDGE

This is a divisional of application Ser. No. 10/784,963 filed Feb. 25, 2004, which is a continuation of application Ser. No. 10/173,273, filed Jun. 18, 2002, and issued as U.S. Pat. No. 6,760,192, which is a Divisional of application Ser. No. 09/701,971, filed Dec. 6, 2000, and issued as U.S. Pat. No. 6,680,818, which claims the benefit of PCT/JP99/02963 filed Jun. 3, 1999; the above noted documents all hereby incorporated by reference.

TECHINICAL FIELD

The invention relates to a magnetic tape cartridge and more particularly relates, in a magnetic tape cartridge for rotatably housing within a cartridge case a single reel having magnetic tape wound thereon, to the structure of reel-rotation restraining means for causing the reel to be in a rotation-restrained state when not being used.

BACKGROUND ART

In conventional tape cartridges used as storage media that are employed in external storage units for computers, etc., there is known a type in which magnetic tape is wound on a single reel and this reel is rotatably housed within a cartridge case. This magnetic tape is employed as a data storing tape for computers, etc., and because important information is stored, reel-rotation restraining means to restrict rotation of the reel is installed so that problems, such as tape jamming, etc., do not occur and so that the magnetic tape is not forwarded unexpectedly when not being used, such as when being archived, etc.

The reel-rotation restraining means is equipped with a restraining member that restricts rotation of the reel by engaging part of the reel, and is provided so that when the cartridge is loaded into a drive unit such as an external storage unit, etc., a restrained state by the restraining member is released according to a reel chucking operation performed by drive-side rotation drive means.

Hence, due to demands for enhancement in the reliability of the aforementioned operation of the reel-rotation restraining means, prevention of dust entry into the cartridge, etc., this reel-rotation restraining means is provided in a structure separated into a restraining member for restricting rotation of the reel, an urging member for urging this restraining member in a restraining direction, and a releasing member for moving the restraining member in a releasing direction by moving in accordance with the chucking operation of the drive-side rotation drive means.

That is, in the non-operative condition, the reel is restricted by the restraining member so that it does not rotate unexpectedly, as a result of which the magnetic tape is not forwarded. However, if the cartridge is loaded into a drive unit and chucking of the reel is performed by rotation drive means, the releasing member moves in interlock with the chucking operation and releases the restraining member. In this state, the reel is rotatable and therefore the magnetic tape can be forwarded and rewound.

In the aforementioned mechanism, it is also preferable to perform the pushing operation, for the releasing movement of the releasing member which results from the chucking operation of the drive-side rotation drive means, at a plurality of positions on the outer peripheral portion rather than at a single position on the center portion, because a stable releasing operation can thus be performed. At this time, it is advantageous in achieving structural simplification, etc., to provide a reel gear, which meshes the driving gear of the drive-side rotation drive means, in the reel, to provide pushing-up portions, formed in part of the releasing member, so that the distal ends abut the driving gear through the through holes provided in the real gear, and to provide the driving gear so that when the drive-side rotation drive means performs the chucking operation, the driving gear pushes the pushing-up portions and releases the releasing member.

However, piercing the reel gear and boring the through holes, as described above, will reduce the mesh between the reel gear and the driving gear and therefore become a problem with respect to driving the reel reliably. If the through hole is reduced from such a respect, the shape of the portion of the releasing member inserted into this through hole will also become smaller and therefore there is a possibility that it will become unstable for the tooth edge of the driving gear to abut the reduced portion accurately and give a reliable pushing operation.

In addition, in the case where the pushing-up portions are formed in part of the releasing member and are inserted into the through holes of the reel and slid, as described above, the releasing member is subjected to the urging force of the urging member and gives rise to bending deformation. As a result, since a tilting force acts on the push-up portion, part of the outside surface is pushed against the inner surface of the through hole and the friction resistance becomes greater, the sliding between the pushing-up portion and the through hole is disturbed, and there is a possibility that the releasing member will not be able to release the restraining member reliably.

The present invention has been made in view of the above-mentioned points, and accordingly, the object of the invention is to provide a magnetic tape cartridge in which the releasing member of the reel-rotation restraining means is capable of performing a reliable releasing operation.

DISCLOSURE OF THE INVENTION

To solve the aforementioned problems, there is provided a magnetic tape cartridge, for rotatably housing within a cartridge case a single reel having magnetic tape wound thereon, comprising reel-rotation restraining means for allowing rotation of the reel when being used and restricting the rotation when not being used; wherein the reel-rotation restraining means has a restraining member for restricting rotation of the reel by moving toward or away from the reel, an urging member for urging the restraining member in a restraining direction, and a releasing member for moving the restraining member in a releasing direction, by rotating integrally with the reel and moving according to chucking operation of drive-side rotation drive means;

the reel is provided with a reel gear which meshes a driving gear of the drive-side rotation drive means, and a pushing-up portion formed in part of the releasing member is provided so that a distal end thereof can abut the driving gear through a through hole provided in the reel gear; and the through hole is bored between tooth edges of the reel gear.

Also, it is preferable that a recess engageable with a tooth edge of the driving gear be formed in a distal end surface of the releasing member which abuts the driving gear.

According to a magnetic tape cartridge such as the aforementioned, the through hole which is provided in the reel gear of the reel-rotation restraining means is formed between the tooth edges of the reel gear. Therefore, even if the through hole is small, the tooth edge of the driving gear which meshes the reel gear can reliably abut the pushing-up portion of the releasing member projecting through the through hole and push the pushing-up portion. Since the movement of the releasing member can be stably performed, the restraining member can be reliably released with a predetermined amount of movement, and the operational reliability of the reel-rotation restraining means can be assured.

In addition, in another magnetic tape cartridge of the present invention, the reel is provided with a reel gear which meshes the driving gear of the drive-side rotation drive means, and a pushing-up portion formed in part of the releasing member is provided so that a distal end thereof can abut the driving gear through a through hole provided in the reel gear. The pushing-up portion and the through hole are brought into contact with each other through small protrusions which reduce the contact area.

According to a magnetic tape cartridge such as the aforementioned, the pushing-up portion provided in the releasing member of the reel-rotation restraining means, and the through hole provided in the reel, are brought into contact with each other through small protrusions which reduce the contact area. As a result, the friction resistance between the two is reduced, and even if bending deformation develops in the releasing member, movement of the pushing-up portions can be stably performed according to the chucking operation of the drive-side rotation drive means. In addition, the restraining member can be reliably released with a predetermined amount of movement, and movement to the restrained state can also be assured. Thus, the operational reliability of the reel-rotation restraining means can be assured.

In a preferred form of the magnetic tape cartridge, the opposite tooth edges of the reel gear between which the through hole is bored are removed so that they become flat shapes, curved surface shapes, or chambered surface shapes.

Another magnetic tape cartridge is characterized in that the releasing member is formed by pressing of a metal sheet.

Still another magnetic tape cartridge is characterized in that the reel is provided with a guide member which guides part of the releasing member in an inserting direction when inserting the pushing-up portion of the releasing member into the through hole.

A further magnetic tape cartridge is characterized in that the pushing-up portion of the releasing member is provided near each vertex of a generally triangular plate base. In a preferred form of this magnetic tape cartridge, the plate base of the releasing member is formed integrally with the pushing-up portion with high-rigidity resin material, while a sliding-contact portion, formed with a separate member having a low friction characteristic, is rigidly attached integrally to a center portion of an upper surface of the base which comes into contact with a center portion of a lower surface of the restraining member.

Another magnetic tape cartridge is characterized in that gate traces for injection molding are provided near centers of rotation of the restraining member and the releasing member. In a preferred form of this magnetic tape cartridge, in the releasing member which has the pushing-up portion and is formed by injection molding, such a bore which reduces a wall thickness of the pushing-up portion is formed in the interior of the pushing-up portion.

Still another magnetic tape cartridge is characterized in that the reel gear is driven to rotate in mesh with a driving gear in which a tooth edge portion thereof is formed into a curved surface.

A further magnetic tape cartridge is characterized in that a tooth edge portion of the reel gear is formed into a curved surface.

Another magnetic tape cartridge is characterized in that the reel is formed by molding a metal reel plate on a bottom surface thereof by insert molding, and the reel is molded by a metal mold in which a hold member for holding an inner peripheral surface of the reel plate is disposed on an outer periphery of a gate.

Still another magnetic tape cartridge is characterized in that the reel is formed by molding a metal reel plate on the inner peripheral side of the reel gear by insert molding, and the reel is molded by a metal mold provided with a means of preventing interference between a gear-portion metal mold for molding the reel gear and the reel plate.

A further magnetic tape cartridge is characterized in that the reel is formed by molding a metal reel plate by insert molding and in that the reel is formed so that outside the outer peripheral surface of the reel plate, a clearance in the form of a circumferential groove is formed between the outer peripheral surface and a bottom wall of the reel, and so that outside the clearance, the reel gear is formed.

Another magnetic tape cartridge is characterized in that the reel is formed by molding a metal reel plate by insert molding and in that the reel is formed so that a reinforcement rib is formed on a surface of the reel plate which contacts a bottom wall of the reel.

Still another magnetic tape cartridge is characterized in that the reel is formed by molding a metal reel plate by insert molding and in that the reel is formed so that a recess is formed in a bottom wall of the reel which the reel plate contacts.

A further magnetic tape cartridge is characterized in that the reel is formed by joining a reel hub and an upper flange portion by adhesion, and in that the reel is formed so that the upper flange portion is provided with a collar portion which fits onto an inner peripheral surface of the reel hub, an annular protruding portion is formed between the collar portion and a surface of the upper flange portion, and so that an end surface of the annular protruding portion and an outer peripheral surface of the collar portion are adhered to the reel hub as adhesion surfaces.

BRIEF DESCRIPTION OF THE DRAWINGS

FIG. 11 is a front sectional view of a magnetic tape cartridge of another embodiment in the non-operative condition;

FIG. 18 is an exploded perspective view of the essential parts of the magnetic tape cartridge of FIG. 17;

FIG. 19 is a sectional view of the essential parts of the magnetic tape cartridge of FIG. 17 in the operative condition;

FIG. 32 is a plan view of the essential parts cut between the upper surface of the releasing member and the lower surface of the restraining member in FIG. 31;

FIG. 33 is a side sectional view showing the essential parts of a rigid attachment structure of the pushing-up portion of the releasing member;

FIG. 34A is a side sectional view showing the essential parts of another rigid attachment structure of the pushing-up portion of the releasing member;

FIG. 34B is a side sectional view showing the essential parts of still another rigid attachment structure of the pushing-up portion of the releasing member;

FIG. 38 is a bottom view of the essential portion of a reel gear;

FIG. 39 is a front sectional view of the essential portion of the reel gear;

FIG. 48A is a front view showing another embodiment of the reel plate;

FIG. 48B is a sectional view of FIG. 48A;

FIG. 49 is a sectional view showing another form of the reel plate and the reel gear;

FIG. 50 is a sectional view showing still another form of the reel plate and the reel gear;

FIG. 51 is a sectional view showing a further form of the reel plate and the reel gear;

FIG. 52 is a sectional view showing a further form of the reel plate and the reel gear;

BEST MODE FOR CARRYING OUT THE INVENTION

Figure 1:
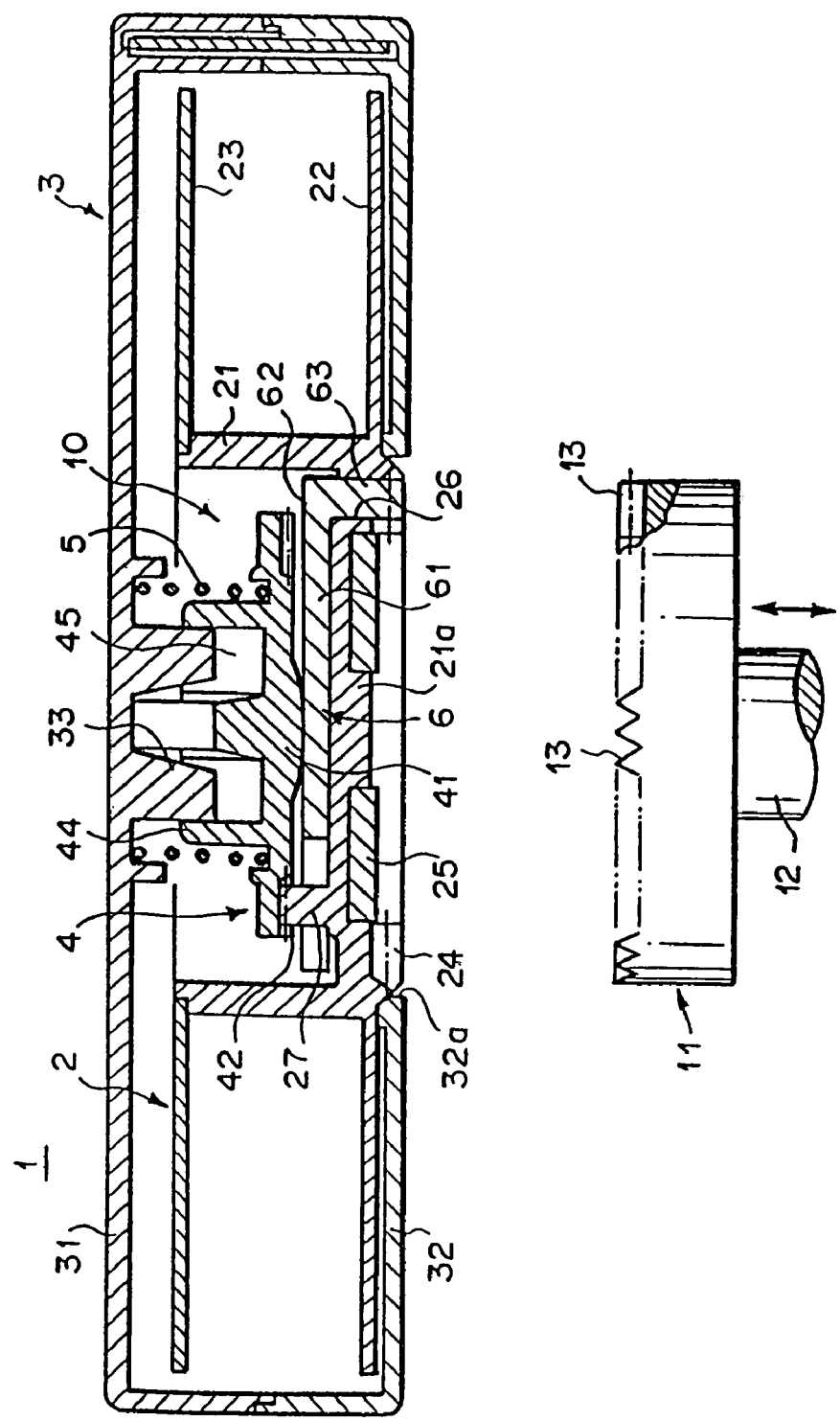
FIG. 1 is a front sectional view of a magnetic tape cartridge of an embodiment of the present invention in the non-operative condition.
Figure 2:
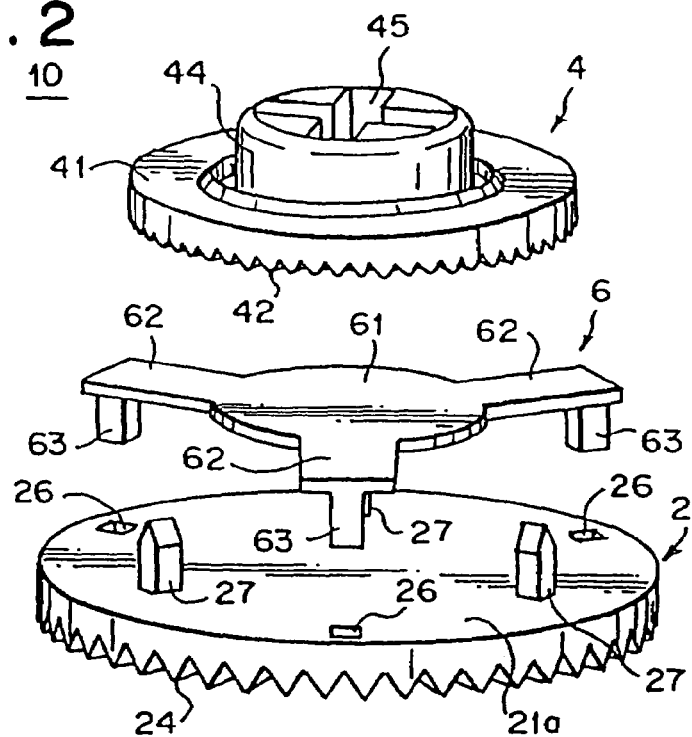
FIG. 2 is an exploded perspective view of the essential parts of the magnetic tape cartridge of FIG. 1.

The present invention will hereinafter be described in detail, based on embodiments shown in the drawings. FIG. 1 is a sectional view of a magnetic tape cartridge of an embodiment in the non-operative condition, FIG. 2 an exploded perspective view of the essential parts, and FIG. 3 a sectional view of the essential parts in the operative condition.

The magnetic cartridge 1 is constructed so that magnetic tape (not shown) is wound on a single reel 2 and that the reel 2 is housed rotatably within a cartridge case 3. The cartridge case 3 is formed by fastening an upper case 31 and a lower case 32, which is provided at a center portion thereof with an opening 32a, together with vis screws, etc. The magnetic tape cartridge 1 is also equipped with reel-rotation restraining means 10 for allowing rotation of the reel 2 when being used, and restricting the rotation when not being used.

The reel 2 consists of a bottomed cylindrical reel hub 21, in which magnetic tape is wound on the outer periphery, and upper and lower flange portions 22 and 23 respectively projected in disk form in the radial direction from the upper and lower ends of the outer periphery of this reel hub 21. The reel hub 21 and the lower flange portion 22 are integrally formed from synthetic resin and are united with the upper flange portion 23, for example, by ultrasonic welding. The reel hub 21 is closed at a lower portion thereof by a bottom wall 21a. A reel gear 24, for driving the reel 2 to rotate, is provided in annular form in the radially outer portion of the lower surface of the bottom wall 21a. A real plate 25 for magnetic suction, formed from an annular metal plate, is attached on the radially inner side from this reel gear 24. And the reel gear 24 and reel plate 25 of the reel 2 are disposed to face an opening 32a in the bottom surface of the cartridge case 3. Note that the reel 2 is urged downward by an urging member 5 to be described later.

In addition, driving-side rotation drive means 11 is equipped on the upper end face of a rotating shaft 12 with a driving gear 13 and a magnet (not shown). With the chucking operation of the drive means 11, the magnetic tape cartridge 1 loaded into a bucket (not shown) on the driving side is lowered to the rotating shaft 12. The driving gear 13 meshes the reel gear 24, and the reel plate 25 is attracted by the magnet, whereby the meshed state is held.

Next, the mechanism of the reel-rotation restraining means 10 will be described. This reel-rotation restraining means 10 has a restraining member 4 movable toward or away from the reel 2 in an up-and-down direction, the urging member 5 for urging the restraining member 4 in a restraining direction, and a releasing member 6 (synthetic resin molded product) for moving the restraining member in a releasing direction.

3 (three) through holes 26 penetrating the reel gear 24 in the up-and-down direction are disposed in the bottom wall 21a of the reel 2 at regular intervals on a circle. Furthermore, 3 (three) stopper protrusions 27 are stood up in the upper surface of the bottom wall 21a at regular intervals on a circle at positions different in phase from the through holes 26, the upper end of each stopper protrusion 27 being formed into a gear tooth shape. Note that three or more through holes 26 and three or more stopper protrusions 27 may be disposed, and the upper end of the stopper protrusion 27 may be formed into a plurality of gear teeth. In the reel 2 shown in FIG. 2, only the part of the bottom wall 21a cut away from the reel 2 is shown.

On the restraining member 4, a disc portion 41 thereof is disposed within the reel hub 21 of the reel 2, facing the bottom wall 21a. A restraining gear 42 is formed in annular form in the radially outer portion of the lower surface of the disc portion 41 and is meshable with the upper ends of the stopper protrusions 27. In addition, the center portion of the lower surface of the disc portion 41 is projected into a convex shape and contacts the center portion of the upper surface of the disc portion 61 of the releasing member 6 that is to be described later.

Furthermore, a protruding portion 44 is formed on the upper surface of the disc portion of the restraining member 4 so that it extends upward. This protruding portion 44 is provided with a stopper groove 45 in the form of a cross, extending in the up-and-down direction. On the other hand, a swivel stopping protrusion 33 which is inserted into the stopper groove 45 is stood up in the inner surface of the upper case 31 of the cartridge case 3. Also, with the engagement between the stopper groove 45 and the swivel stopping protrusion 33, the restraining member 4 is disposed so as to be movable in the up-and-down direction without rotating. Note that the stopper groove 45 and the swivel stopping protrusion 33 may be provided in the form of a straight line. Also, the swivel stopping protrusion may be formed in the restraining member 4, and the stopper groove may be formed in the upper case 31.

The urging member 5 such as a coil spring is compressedly interposed between the upper surface of the disc portion 41 on the radially outer side from the protruding portion 44 and the inner surface on the radially outer side of the swivel stopping protrusion 33, whereby the restraining member 4 is urged downward in the restraining direction where the restraining gear 43 and the stopper protrusion 27 engage each other.

In addition, the releasing member 6 is interposed between the restraining member 4 and the bottom wall 21a of the reel hub 21 so that it is movable up and down. At three positions on the radially outer portion of the disc portion 61 on the central side, arm portions 62 are formed to extend in the radial direction. The arm portions 62 are provided on the outer lower surface with pushing-up portions 63 in the form of a square bar extending in the up-and-down direction, respectively. The pushing-up portions 63 are inserted into the through holes 26 bored in the reel hub 21 so that they are movable into and out of the through holes 26, respectively. The lower ends of the pushing-up portions 63 are located facing the tooth portion of the reel gear 24 of the lower surface of the reel hub 21. At this time, each of the stopper protrusions 27 is located between two adjacent arm portions 62. Note that the pushing-up portion 63 may be formed into a round bar shape.

Figure 3:
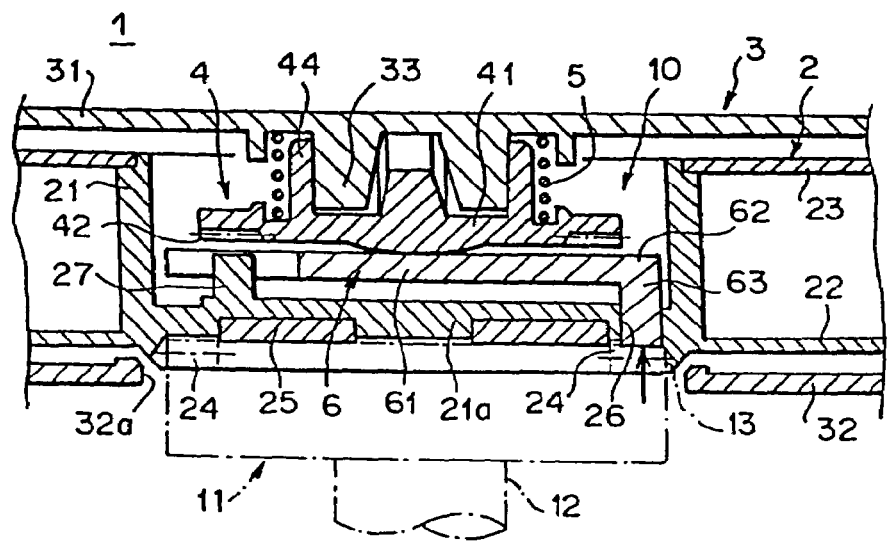
FIG. 3 is a sectional view of the essential parts of the magnetic tape cartridge of FIG. 1 in the operative condition.

At the lower most position of the releasing member 6 (FIG. 1), the lower end face of the pushing portion 63 is at approximately the tooth edge position of the reel gear. As the driving gear 13 is meshed with the reel gear 24 by the chucking operation of the drive-side rotation drive means 11, the releasing member 6 is pressed and is pushed up by a predetermined amount of stroke (FIG. 3). Also, if it is fitted into the through holes 26 of the pushing-up portion 63, this releasing member 6 rotates integrally with the reel 2. In addition, the lower end of the central convex portion of the lower surface of the restraining member 4 is urged to abut the upper surface of the releasing member 6 by the urging member 5, and both make sliding contact with each other.

Figure 4:
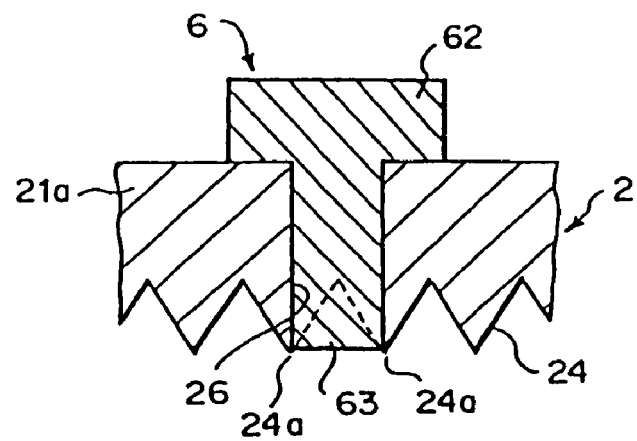
FIG. 4 is a vertical sectional view of the essential parts of the through hole of the reel and the pushing-up portion of the releasing member in FIG. 1.

The through hole 26 formed in the reel gear 24 of the reel 2 is bored between adjacent tooth edges 24a of the reel gear 24 so that it has a width of one pitch, as shown in FIG. 4. That is, it is bored so that the center of the pushing-up portion 63 of the releasing member 6 inserted into this through hole 26 becomes the center of the tooth groove and coincides with the tooth edge of the driving gear 13 which meshes with this reel gear 24.

The opening width of the through hole 26 is provided so that it is about one pitch or two pitches of the real gear 24.

Note that at least either the restraining member 4 or the releasing member 6 may be formed with synthetic resin containing a lubricant such as molybdenum disulfide, polytetrafluoroethlene, graphite, potassium titanate whisker, silicon (various grades of dimethylpolysiloxane and the degenerated substances), etc., whereby the lubrication may be improved. Also, along with the above-mentioned lubricant, a lubricant, such as, an oleic acid amide lubricant, an erucic acid lubricant, a stearic acid amide lubricant, a bisfatty acid amide lubricant, a non-ion interfacial active lubricant, a hydrocarbon lubricant, a fatty acid amide lubricant, an ester lubricant, an alcohol lubricant, a metallic soap, etc., may be doped. Furthermore, it is preferable that synthetic resin employ polycarbonate (PC), polyoxymethylene (POM), acrylonitrile butadiene styrene (ABS) containing glass fiber, polyphenylenesulfide (PPS), aliphatic polyamide such as nylon 6 or nylon 66, aromatic polyamide, ultra high polymer polyethylene, isotactic polypropylene, syndiotactic polystyrene; and wear-resisting resin with an imide group, such as polyimide, polyamideimide, polyetherimide, etc. This reduces the friction and wear between the sliding-contact portions of both, and because of a reduction in the driving resistance, the reel 2 can be stably rotated. In addition, the occurrence of powder due to wear is suppressed, whereby the reliability of recording and reproducing performances can be assured.

The operation of the reel-rotation restraining means 10 will be described. FIG. 1 shows a non-operative condition, such as an archived condition, etc., of the magnetic tape cartridge 1. In this condition, the restraining member 4, the releasing member 6, and the reel 2 are moved to the side of the lower case 32 of the cartridge case 3 by the urging force of the urging member 5, and the opening 32a of the center portion of the lower case 32 is closed by the reel 2. The releasing member 6 is in the lower most state in which the lower surface abuts the upper surface of the bottom wall 21a of the reel hub 21, and the pushing-up portions 63 are projected so as to coincide with the tooth edge position of the reel gear 24. The restraining member 4 abutting the upper surface of the releasing member 6 is also at its lowered position, and the upper end portions of the stopper protrusions 27 engage the restraining member 4, whereby rotation of the reel 2 when not being used is restricted and forwarding of magnetic tape is inhibited.

On the other hand, when the cartridge of FIG. 3 in which the magnetic tape cartridge 1 is loaded into the drive is being used, the rotating shaft 12 of the drive-side rotation drive means 11 approaches the bottom surface of the reel 2, and with the chucking operation, the driving gear 13 meshes the reel gear 24 and moves and holds the reel 2 slightly upward. Then, the tooth edge of the driving gear 13 abuts the lower end of the pushing-up portion 63 of the releasing member 6 and pushes up this. As a result, the releasing member 6 moves upward against the urging force of the urging member 5, and the restraining member 4, along with this releasing member 6, also moves in the upward releasing direction. This releases the engagement between the restraining gear 42 and the stopper protrusions 27, whereby the reel 2 becomes free to rotate. The magnetic tape is also forwarded or rewound by the drive of a recording-reproducing unit.

In the released state, the lower ends of the pushing-up portions 63 of the releasing member 6 are abutted, within the through holes 26 bored between the tooth edges of the reel gear 24, with the tooth edges of the driving gear 13 with reliability and are pushed up, and the upward movement can be linearly performed with stability. Therefore, the restraining member 4 is moved by a predetermined amount of stroke, whereby the engagement between the restraining gear 42 and the stopper protrusions 27 can be reliably released.

Figure 5A:
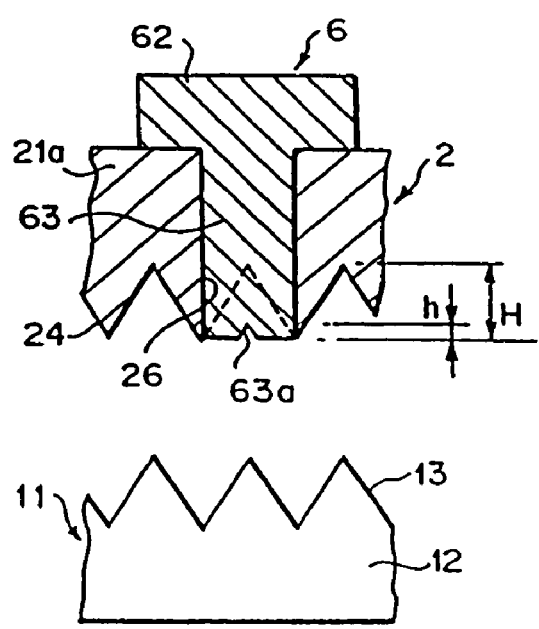
FIG. 5A is a sectional view showing the essential parts of another embodiment of the pushing-up portion of the releasing member before a chucking operation.
Figure 5B:
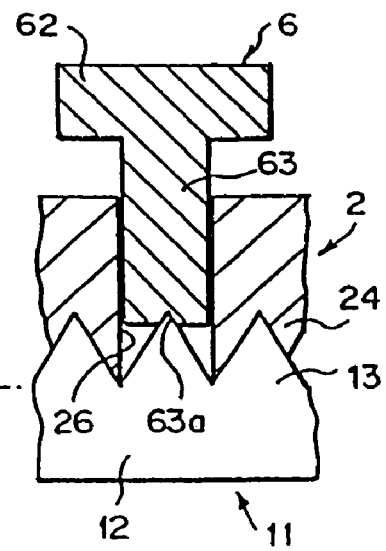
FIG. 5B is a sectional view showing the essential parts of FIG. 5 after the chucking operation.

Next, FIGS. 5A and 5B show another embodiment, which is formed in the same manner as the aforementioned embodiment, except that the lower end of the pushing-up portion 63 of the releasing member 6 differs.

The pushing-up portion 63, as with the aforementioned, is inserted into the through hole 26 bored between the tooth edges 24a of the reel gear 24, and a recess 63a engageable with the tooth edge of the driving gear 13 is formed in the center portion of the lower end face of the pushing-up portion 63 which abuts the driving gear 13 of the drive-side rotation drive means 11.

When the depth of mesh between the reel gear 24 and the driving gear 13 is taken to be H and the depth of mesh between the restraining gear 41 and the stopper protrusion 27 (i.e., releasing height) is taken to be D (not shown), the engagement depth h of the recess 63a of the pushing-up portion 63 with the driving gear 13 is set so that the effective pushing-up height (H-h) of the pushing-up portion 63 is sufficiently greater than the releasing height (D), i.e., H-h>>D, whereby it is necessary to assure the releasing operation.

The pushing-up portion 63 in this embodiment has the recess 63a at the lower end face. Therefore, with the chucking operation of the drive-side rotation drive means 11, the tooth edge of the driving gear 13 engages the recess 63a of the pushing-up portion 63 from the non-operative condition of FIG. 5A, as shown in FIG. 5A, and therefore, the reliable operation of pushing up the releasing member 6 is obtained from the initial stage of the upward movement of the driving gear 13.

Figure 6:
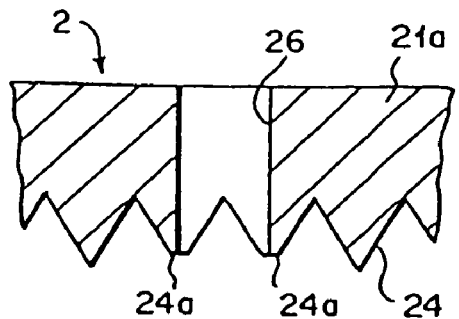
FIG. 6 is a sectional view showing the essential part of another embodiment of the reel gear.

FIG. 6 illustrates another embodiment of the reel gear 24. The lower ends of the opposite tooth edges 24a of the reel gear 24 between which the through hole 26 is bored are removed so that they become flat shapes. The lower ends of the opposite tooth edges 24a may be removed so that they become R shapes which form curved faces, or C shapes which form chamfered faces, instead of becoming flat shapes.

The tooth edge 24a of the rear gear 24 at the open end of the through hole 26 is sharp if it is left as it is, but since it is removed so as to be low in height, as described above, formation of the metal mold becomes easy and formability is enhanced.

Figure 7:
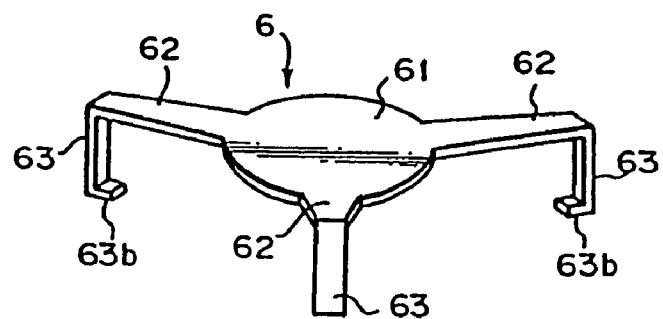
FIG. 7 is a perspective view showing another embodiment of the releasing member.
Figure 8:
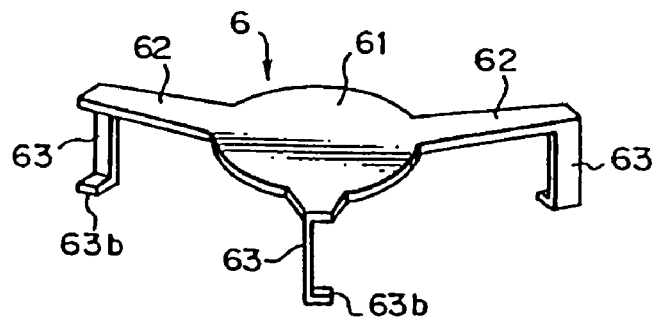
FIG. 8 is a perspective view showing still another embodiment of the releasing member.

Next, FIGS. 7 and 8 show other embodiments of the aforementioned releasing member 6, in which releasing members 6 are formed by metal sheet pressing.

That is, in FIG. 7 a metal plate is punched out into the development shape of the disk portion 61, arm portions 62, and pushing-up portions 63 of the releasing member 6. The pushing-up portions 63 are formed by bending the outer extension portions of the arm portions 62 downward, and furthermore, abutting portions 63b are formed by bending the lower end portions of the pushing-up portions 63 inward. Note that the abutting portions 63b may be formed in the sheet thickness of the pushing-up portion 63 without being bent.

Also, in the example of FIG. 8 the pushing-up portion 63 is bent downward from the side portion of the outer end of the arm portion 62, and furthermore, the abutting portion 63b is formed by bending the lower end portion of the pushing-up portion 63.

For the aforementioned releasing members 6 that are formed by metal sheet pressing, it becomes easy to assure rigidity and it is possible to design them to a thickness such that the releasing member cannot obtain sufficient rigidity when formed from synthetic resin. Therefore, thinning of the releasing member 6 makes it easy to assure the installation space for the reel-rotation restraining means 10, and a reduction in the size of the through hole 26 in the reel gear 24 can increase the area of mesh of the reel 2 with the drive-side rotation drive means 11.

Figure 9A:
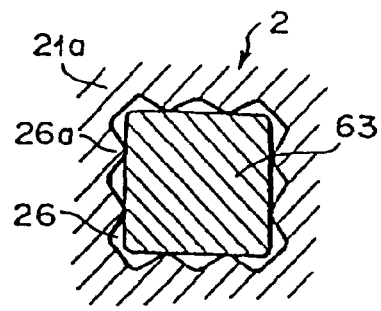
FIG. 9A is a cross sectional view showing another embodiment of the through hole of the reel and the pushing-up portion of the releasing member.
Figure 9B:
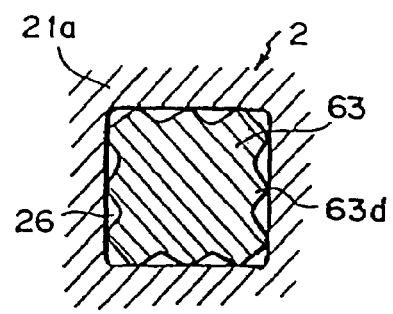
FIG. 9B is a cross sectional view showing still another embodiment of the through hole of the reel and the pushing-up portion of the releasing member.

Next, FIGS. 9A and 9B show other embodiments of the through hole 26 and pushing-up portion 63. The inner periphery of the through hole 26 formed in the reel gear 24 of the reel 2 and the outer periphery of the pushing-up portion 63 of the releasing member 6 are constructed so that they contact each other through small protrusions, provided on either surface, which reduce the contact area.

First, in the example of FIG. 9A, the pushing-up portion 63 is square in cross section and the surface is smooth, and small protrusions 26a are formed on the inner periphery of the through hole 26 in the longitudinal direction along the moving direction of the pushing-up portion 63. In the example of FIG. 9B, the through hole 26 is square in cross section and the inner surface is smooth, and small protrusions 63d are formed on the surface of a pushing-up portion 63 in the form of a square bar, in the longitudinal direction along the moving direction. The above-mentioned small protrusions 26a, 63d are about a few tens μm in height, and in the drawings, they are shown on an enlarged scale.

Figure 10A:
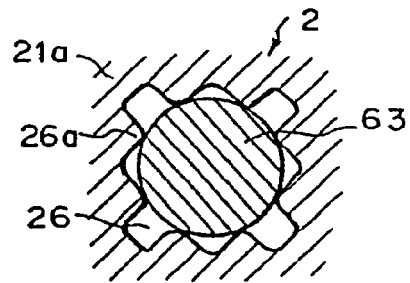
FIG. 10A is a cross sectional view showing a further embodiment of the through hole of the reel and the pushing-up portion of the releasing member.
Figure 10B:
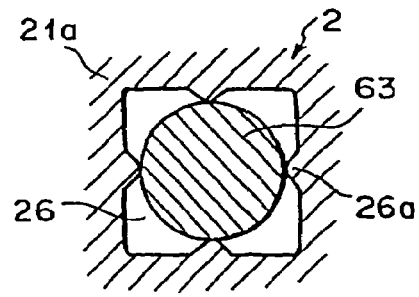
FIG. 10B is a cross sectional view showing a further embodiment of the through hole of the reel and the pushing-up portion of the releasing member.

In FIGS. 10A and 10B there is shown a further embodiment in which the pushing-up portion 63 is formed into a round bar shape, and small protrusions which reduce a contact area are provided on the inner periphery of a through hole 26 formed in the shape of a square hole.

That is, in the example of FIG. 10A, the surface of the pushing-up portion 63 in the form of a round bar is smooth, and a plurality of small protrusions 26a are formed on each surface of the inner surfaces of the through hole 26 in the longitudinal direction along the moving direction of the pushing-up portion 63. In the example of FIG. 10B, the surface of the pushing-up portion 63 in the form of a round bar is smooth, and a small protrusion 26a is formed in the center portion of each surface of the inner surfaces of the through hole 26 in the longitudinal direction along the moving direction of the pushing-up portion 63. Note that small protrusions which reduce a contact area may be provided on the surface of the pushing-up portion 63 in the form of a round bar. In addition, the through hole 26 may be formed into the shape of a round hole.

In the movement of the reel-rotation restraining means 10 in this example from the restrained state to the released state, or the movement from the released state to the restrained state, the outer periphery of the pushing-up portion 63 of the releasing member 6 and the inner periphery of the through hole 26 of the reel 2 are in contact with each other through small protrusions 26a or 26b which reduce the contact area, and therefore, the frictional resistance becomes smaller and stable movement of the pushing-up portion 63 is reliably performed.

Figure 12:
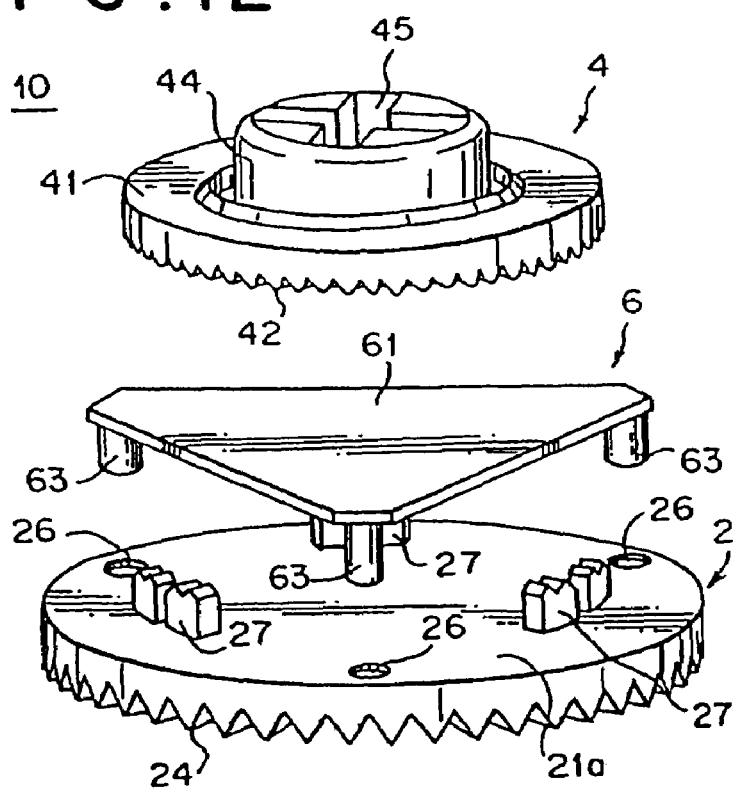
FIG. 12 is an exploded perspective view of the essential parts of the magnetic tape cartridge of FIG. 11.
Figure 13:
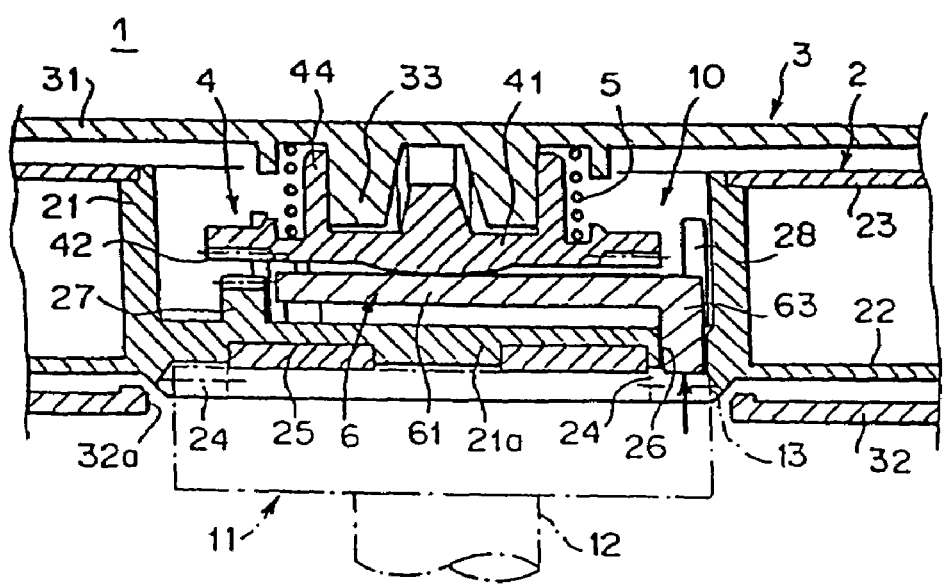
FIG. 13 is a sectional view of the essential parts of the magnetic tape cartridge of FIG. 11 in the operative condition.
Figure 14:
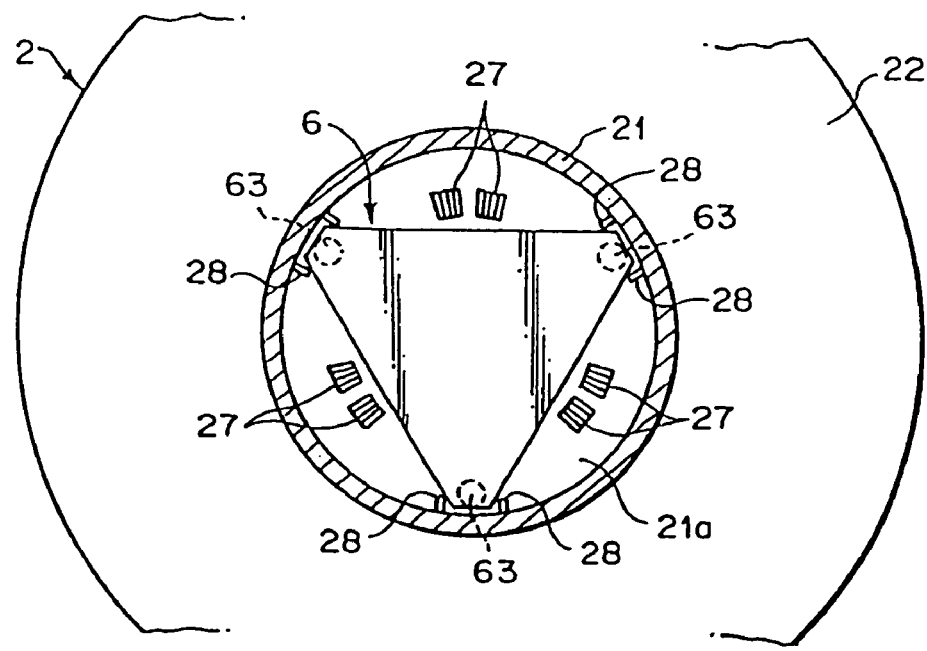
FIG. 14 is a sectional plan view showing the assembled state of the reel and releasing member of FIG. 11.
Figure 15:
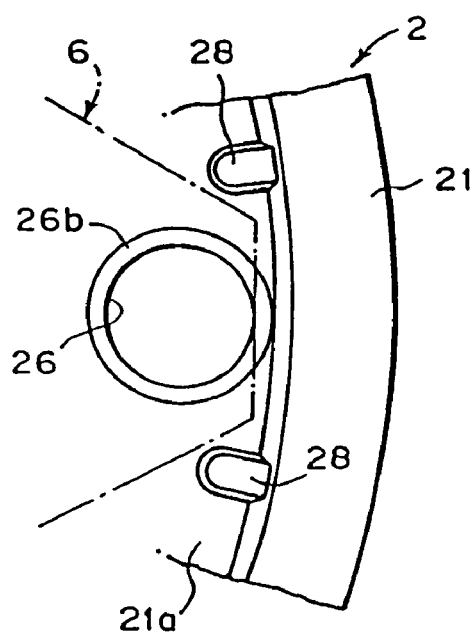
FIG. 15 is an enlarged part-plan view of the reel of FIG. 11.

Next, FIG. 11 is a sectional view of a magnetic tape cartridge of another embodiment in the non-operative condition, FIG. 12 an exploded perspective view of the essential parts, and FIG. 13 a sectional view of the essential parts in the operative condition.

The basic structure and operation of a reel 2, a cartridge case 3, reel-rotation restraining means 10, etc., of a magnetic tape cartridge 1 in this embodiment are the same as the aforementioned embodiment, and the same reference numerals will be applied to the same parts to omit a description thereof.

Note that three pairs of two stopper protrusions 27 are stood up in the upper surface of the bottom wall 21a of the reel 2 at regular intervals on a circle at positions different in phase from through holes 26, the upper end of each stopper protrusion 27 being formed into a plurality of gear teeth. Note that three or more through holes 26 and three or more stopper protrusions 27 may be disposed, and the upper end of the stopper protrusion 27 may be formed into a single gear tooth. In the reel 2 shown in FIG. 2, only the part of the bottom wall 21a cut away from the reel 2 is shown.

In addition, the releasing member 6 of the reel-rotation restraining means 10 is provided on the lower surfaces near the vertexes of a generally triangular plate base 61 with pushing-up portions 63 in the form of a column extending in the up-and-down direction, respectively. Between the pushing-up portions 63, the stopper protrusions 27 are positioned outside the plate base 61. Note that the pushing-up portion 63 may be formed into the shape of a square pillar, an elliptic cylinder, etc.

Figure 16:
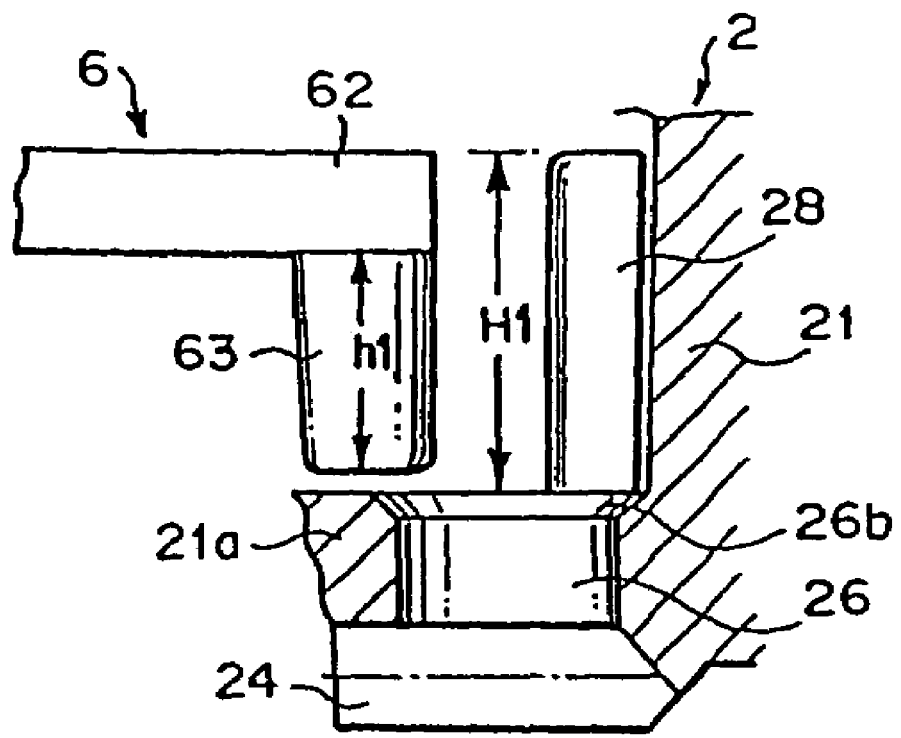
FIG. 16 is a sectional view of the essential parts of the reel and releasing member of FIG. 11.
Figure 17:
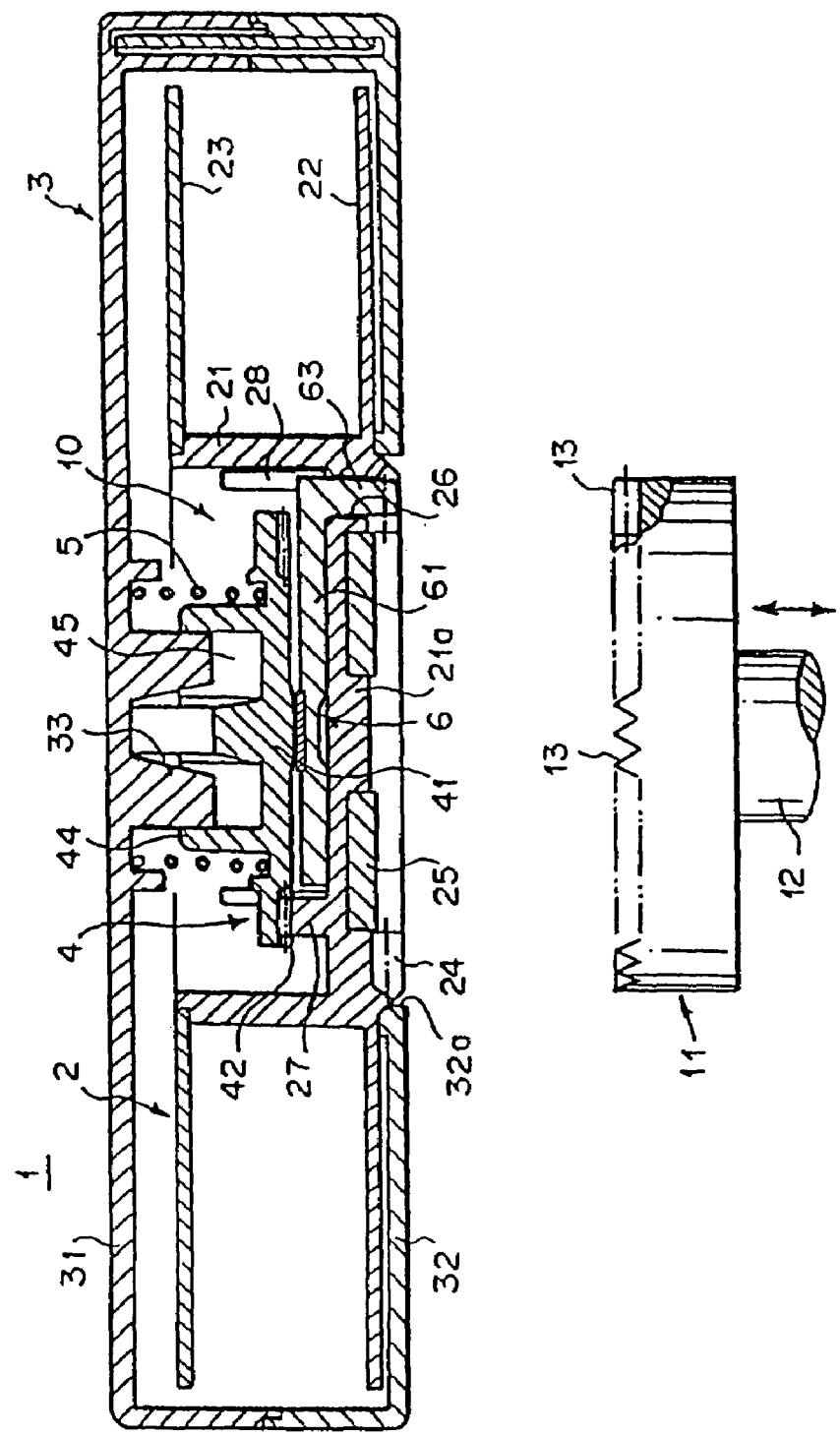
FIG. 17 is a front sectional view of a magnetic tape cartridge of still another embodiment in the non-operative condition.

Also, in the reel 2, guide members 28 are installed for guiding part of the releasing member 6 in an inserting direction when the pushing-up portions 63 of the releasing member 6 are inserted into the through holes 26. The guide members 28, as shown in FIGS. 16 through 18, are formed with two guide ribs, extending in the up-and-down direction (direction of inserting the pushing-up portion 63), which guide both corner portions of each vertex of the generally triangular plate base 61 of the releasing member 6 to the inner wall of the reel hub 21 of the reel 2 near the through hole 26 formed in the reel gear 24.

The height H1 (refer to FIG. 16) of the guide member 28 (guide rib) is formed greater than the height h1 of the pushing-up portion 63 so that when the pushing-up portion 63 is inserted into the through hole 26 downward, the plate base 61 guided before the lower end portion of the pushing-up portion 63 reaches the upper open end of the through hole 26. In addition, the circumferential edge of the upper open end of the through hole 26 is formed into a taper face 26b so that the lower end of the pushing-up portion 63 is guided into the through hole 26.

If holding of the releasing member 6 is released and drops after each vertex of the plate base 61 is positioned by the guide member 28 so that each pushing-up portion 63 of the releasing member 6 is above each through hole 26, the pushing-up portion 63 is moved in the inserting direction and inserted into the through hole 26 by the guide of the guide member 28 in the inserting direction, whereby the releasing member 6 is assembled into the reel 2.

Note that for assembling of the magnetic tape cartridge 1, the lower case 32 is placed facing upward, and the reel 2 is placed on this. Subsequently, the releasing member 6 is installed while being guided by the guide members 28, and the restraining member 4 and the urging member 5 are placed on the member 6. Then, the upper case 31 is placed, and thereafter, the top and bottom are reversed and screws are tightened through the side of the lower case 32, whereby assembling is completed.

While, in this embodiment, the guide members 28 are formed in the inner wall of the reel hub 21, the installation position is not limited to this. At positions where the guide members 28 do not interfere with the restraining member 4, the guide members 28 may be projected from the bottom wall 21a of the reel 2 so that part of the releasing member 6 is guided in the inserting direction of the pushing-up portion 63. In addition, the through holes 26 may be provided in the radially inner side from the reel gear 24.

According to this embodiment, the positioning of the pushing-up portions 63 in inserting the pushing-up portions 63 of the releasing member 6 into the through holes, and the assembling of the reel 2 and the releasing member 6 through guiding of the movement in the inserting direction, can be easily performed by providing the guide members 28 in the reel 2. As a result, assembling of the magnetic tape cartridge 1 as a whole can be efficiently performed.

Particularly, if the pushing-up portions 63 of the releasing member 6 are inserted into the through holes 26 bored in the reel gear 24 provided in the reel 2 and the lower ends of the pushing-up portions 63 can abut the driving gear 13, and if the guide members 28 (guide ribs) extending in the inserting direction of the pushing-up portion 63 are provided in the inner wall of the reel 2 near the through holes 26, the guide members 28 can be formed without interfering with other components such as the restraining member 4, etc., and guiding of the releasing member 6 at the time of assembling can be satisfactorily performed near the through holes 26.

Figure 20:
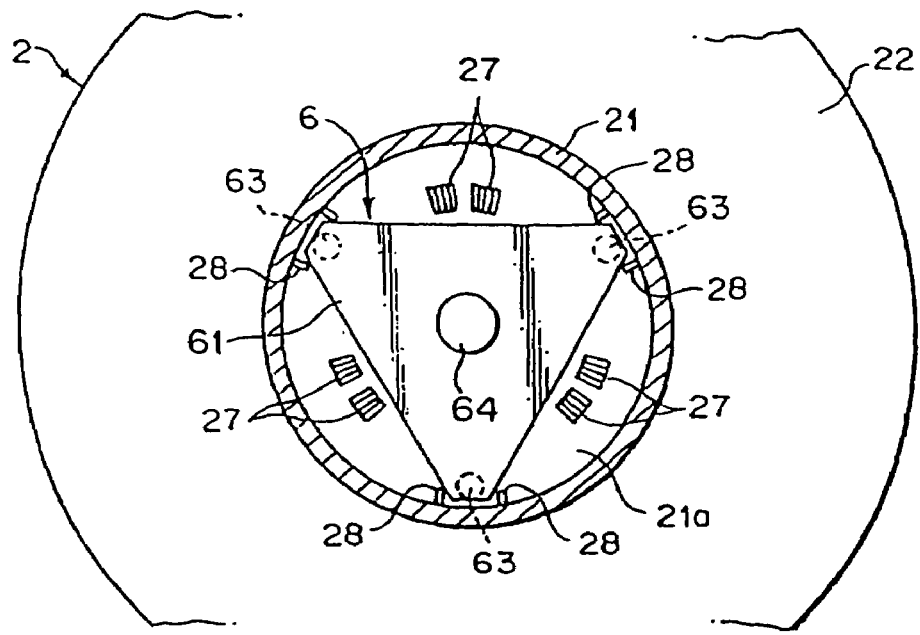
FIG. 20 is a plan view of the essential parts cut between the upper surface of the releasing member and the lower surface of the restraining member in FIG. 19.

Next, FIG. 17 is a sectional view of a magnetic tape cartridge of still another embodiment in the non-operative condition, FIG. 18 is an exploded perspective view of the essential parts, FIG. 19 is a sectional view of the essential parts in the operative condition, and FIG. 20 is a plan view of a releasing member in the assembled state.

The basic structure and operation of a reel 2, a cartridge case 3, reel-rotation restraining means 10, etc., of a magnetic tape cartridge 1 in this embodiment are the same as the aforementioned embodiment, and the same reference numerals will be applied to the same parts to omit a description thereof.

The releasing member 6 of the reel-rotation restraining means 10 is provided on the lower surfaces near the vertexes of a generally triangular plate base 61 with pushing-up portions 63 (leg portions) in the form of a column extending in the up-and-down direction, respectively. The base 61 is formed integrally with the pushing-up portions 63 by high-rigidity resin material, while at the center portion of the upper surface a sliding-contact portion 64 which contacts the center portion of the lower surface of the restraining member 4 is formed with a separate member having a low friction characteristic and is rigidly attached integrally to the base 61. The center portion of the lower surface of the disc portion 41 of the restraining member 4 is formed into a convex shape and is pushed against the sliding-contact portion 64.

Figure 21:
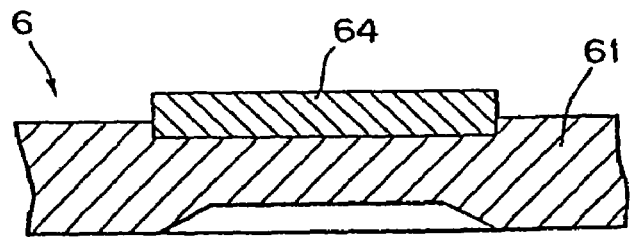
FIG. 21 is an enlarged sectional view of the center portion of the releasing member.

The sliding-contact portion 64, as shown in FIG. 21, is provided by a resin molded product in the form of a disk block and is rigidly attached within the recess of the base 61, with the upper surface projected from the upper surface of the base 61.

As high-rigidity resins for forming the base 61 of the releasing member 6, there are, for example, polycarbonate (PC) or PC doped with glass fiber, ABS resin doped with glass fiber, etc. Also, as low-friction characteristic materials for the sliding-contact portion 64, there are polyoxymethylene (POM), nylon dopped with molybdenum disulfide, polytetrafluoroethylene (PTFE), etc.

Figure 22:
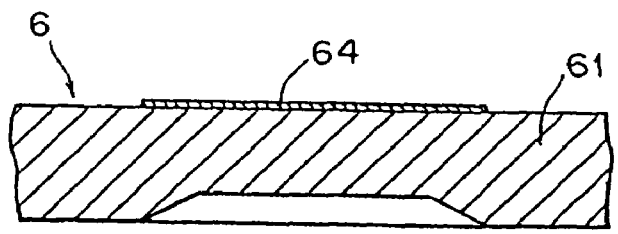
FIG. 22 is an enlarged sectional view of the center portion of the releasing member in another embodiment.

FIG. 22 illustrates another embodiment of the sliding-contact portion 64 of the releasing member 6. This sliding-contact portion 64 is formed by fixedly attaching a separate member, formed into a tape-like shape, which has a low friction characteristic, at a flat center position of the base 6.

Also, in the released state in the reel-rotation restraining means 10, the pushing-up portions 63 of the lower ends of the releasing member 6 are pushed upward by the driving gear 13, while the urging force of the urging member 5 acts downward through the restraining member 4 and therefore bending deformation will easily develop in the base 61. However, since this base 61 is molded with high-rigidity resin, the bending deformation becomes smaller. Therefore, the pushing-up portion 63 can move linearly into and out of the through hole 26 with stability without contacting one side of the through hole 26, and the engagement of the restraining gear 41 and the stopper protrusions 27 can be reliably released by moving the restraining member 4 by a predetermined amount of stroke. In addition, because the thickness of the releasing member 6 can be reduced, an amount of stroke for movement can be sufficiently assured.

On the other hand, if the reel 2 is rotated by forwarding or rewinding the magnetic tape with the drive unit of the recording-reproducing unit, the releasing member 6 rotates integrally with the reel 2, but the restraining member 4 does not rotate because it is in a state locked integrally to the side of the cartridge case 3. The releasing member 6 rotates and slides in a low friction or low worn state with respect to the restraining member 4 through the sliding-contact portion 64 having a low friction characteristic. This reduces the rotation resistance of the reel 2 and enhances the wear-resisting property, whereby the occurrence of powder due to wear can also be reduced.

According to this embodiment such as the aforementioned, the base 61 of the releasing member 6 is molded with high-rigidity resin material, and the sliding-contact portion 64 contacting the restraining member 4 is formed with a separate member having a low friction characteristic. Therefore, the rigidity of the releasing member 6 is enhanced and the bending deformation is reduced. Since stable movement of the releasing member 6 is performed, the restraining member 4 can be reliably released with a predetermined amount of movement, and the operational reliability of the reel-rotation restraining means 10 can be assured. In addition, the friction and wear between the sliding-contact portions of both are reduced, and because of a reduction in the resistance to driving, stable rotation of the reel 2 can be performed. The occurrence of powder due to wear is reduced, whereby the reliability in recording-reproducing performance can be assured. Thus, the releasing member 6 is also suitable for mass production.

That is, the releasing member 6 requires high rigidity and a low friction characteristic. However, if it is provided by an integral resin molded product, there is no resin material meeting both requirements, and even if it did exist, it would be a special and expensive material and will not be suitable for mass production.

Figure 23:
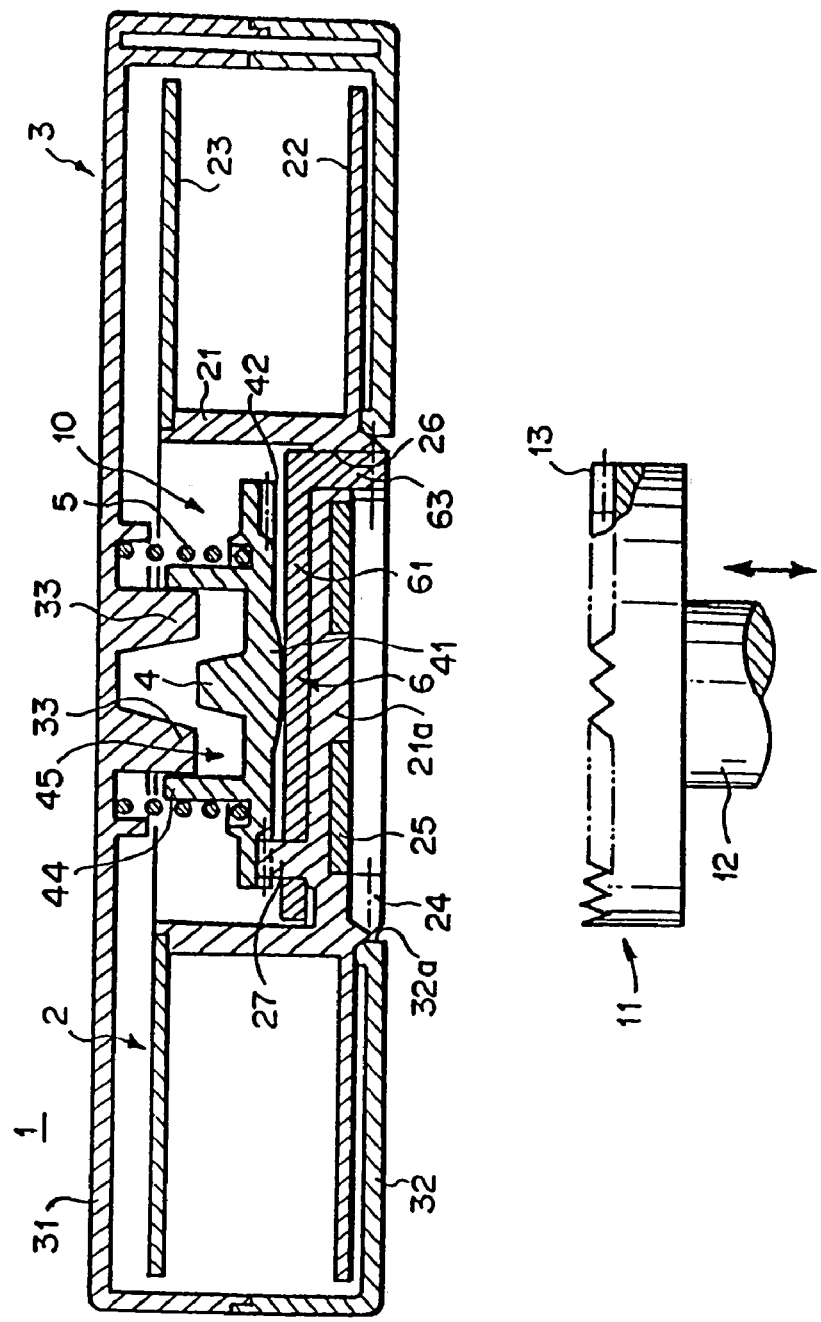
FIG. 23 is a front sectional view of a magnetic tape cartridge of a further embodiment in the non-operative condition.
Figure 24:
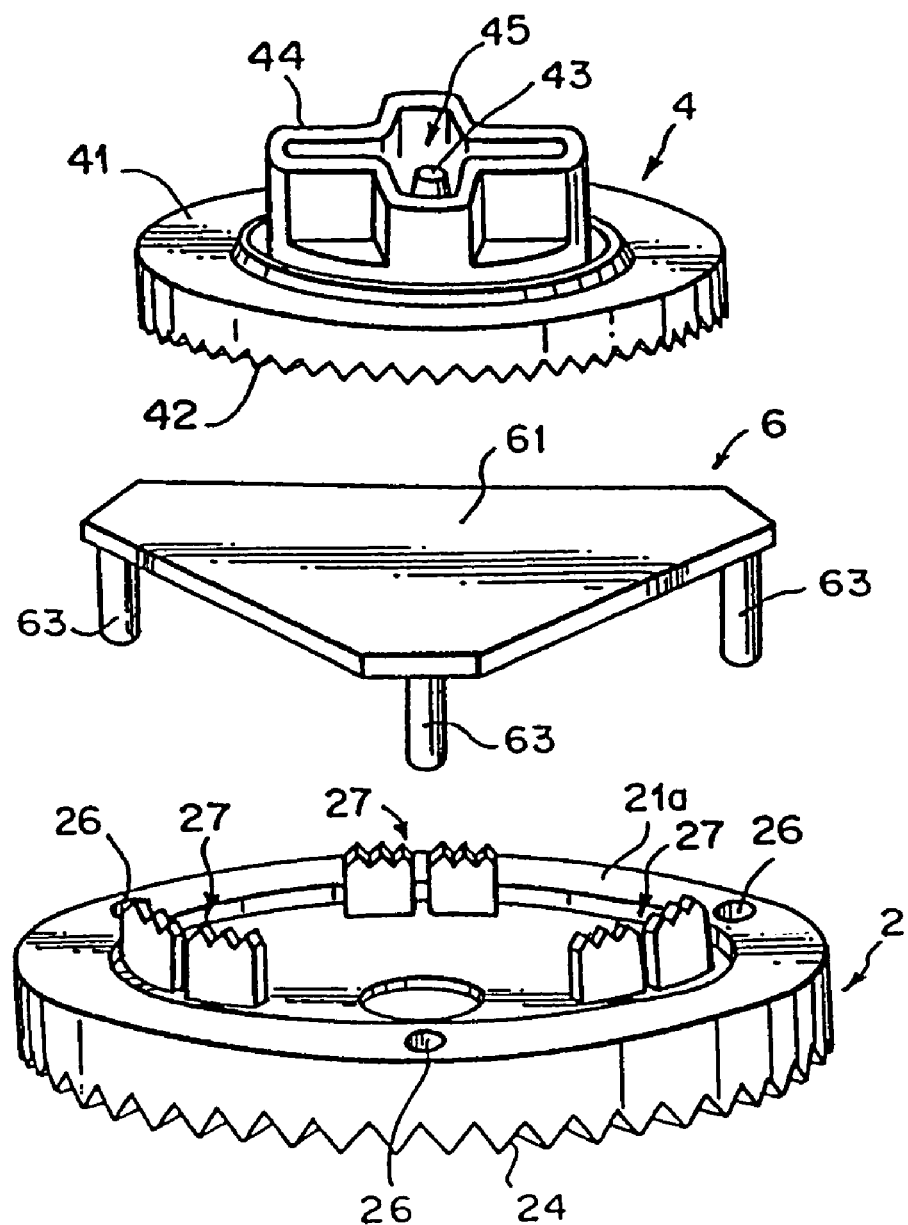
FIG. 24 is an exploded perspective view of the essential parts of the magnetic tape cartridge of FIG. 23.
Figure 25:
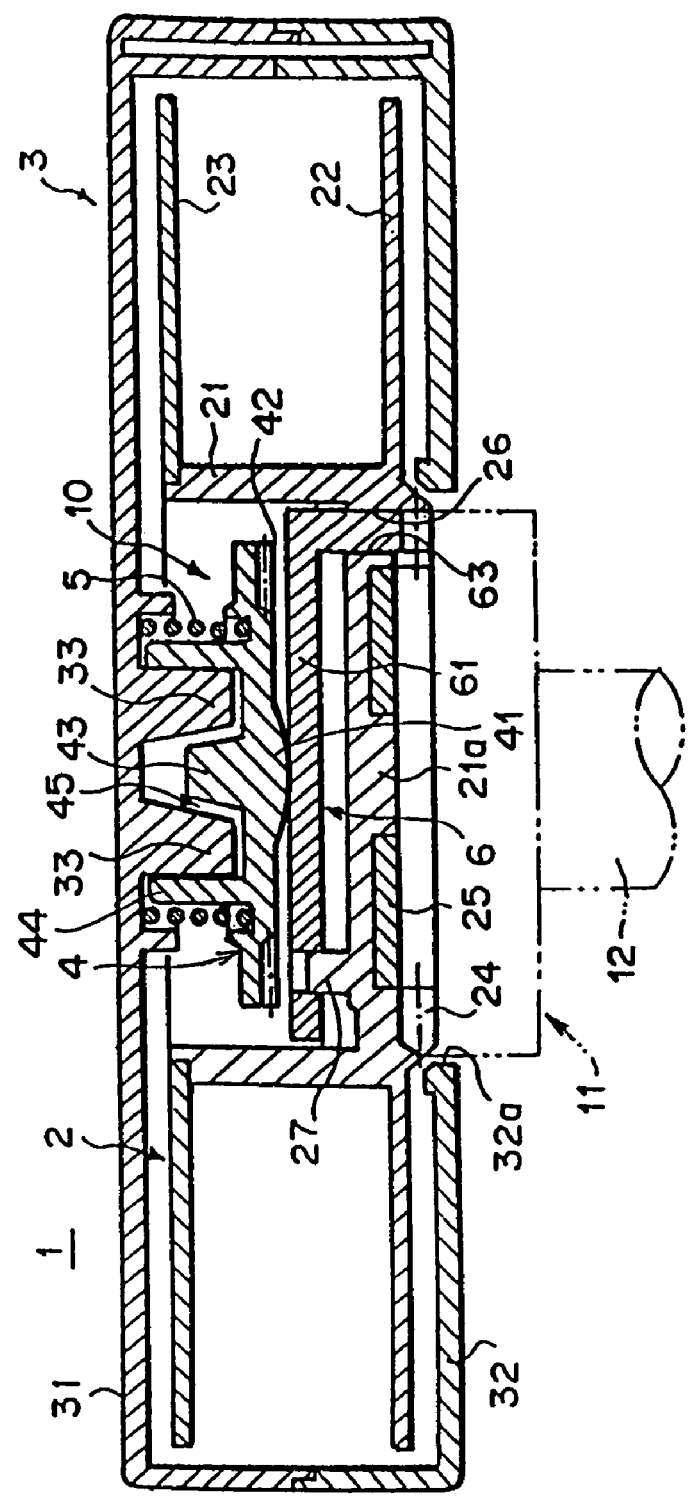
FIG. 25 is a sectional view of the essential parts of the magnetic tape cartridge of FIG. 23 in the operative condition.

Next, FIG. 23 is a sectional view of a magnetic tape cartridge of a further embodiment in the non-operative condition, FIG. 24 is an exploded perspective view of the essential parts, and FIG. 25 is a sectional view of the essential parts in the operative condition.

The basic structure and operation of a reel 2, a cartridge case 3, reel-rotation restraining means 10, etc., of a magnetic tape cartridge 1 in this embodiment are the same as the aforementioned embodiment, and the same reference numerals will be applied to the same parts to omit a description thereof.

Figure 26A:
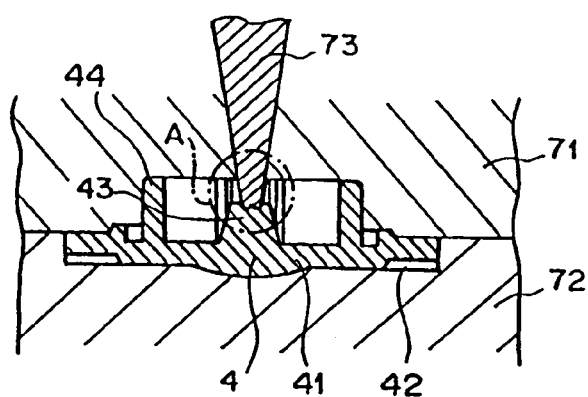
FIG. 26A is a sectional view showing an injection-molded state of the restraining member.
Figure 26B:
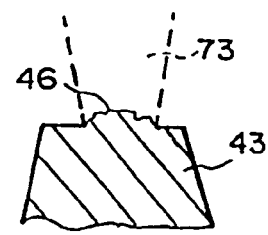
FIG. 26B is an enlarged view of the portion A in FIG. 26A.

FIG. 26A is a diagram showing how the restraining member 4 of the reel-rotation restraining means 10 is molded by injection molding, and FIG. 26B is an enlarged view of the essential part A in FIG. 26A. The restraining member 4 is molded by injecting resin into a space formed by a stationary metal mold 71 and a movable metal mold 72 through a gate from a runner 73. At this time, the runner 73 is connected to a protruding portion 43, formed at the rotation center position of the reel 2 on the opposite surface of the restraining member 4 from the surface which slides on the releasing member 6, and when the movable metal mold 72 is moved in order to take out a molded product after molding, the runner 73 is separated from the restraining member 4 and a gate trace 46 is formed.

Figure 27A:
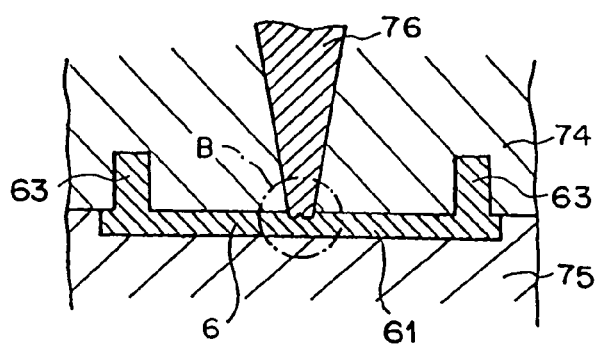
FIG. 27A is a sectional view showing an injection-molded state of the releasing member.
Figure 27B:
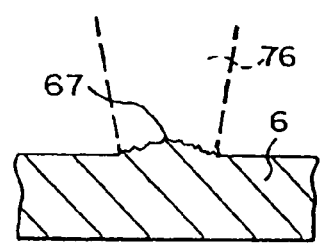
FIG. 27B is an enlarged view of the portion B in FIG. 27A.
Figure 28:
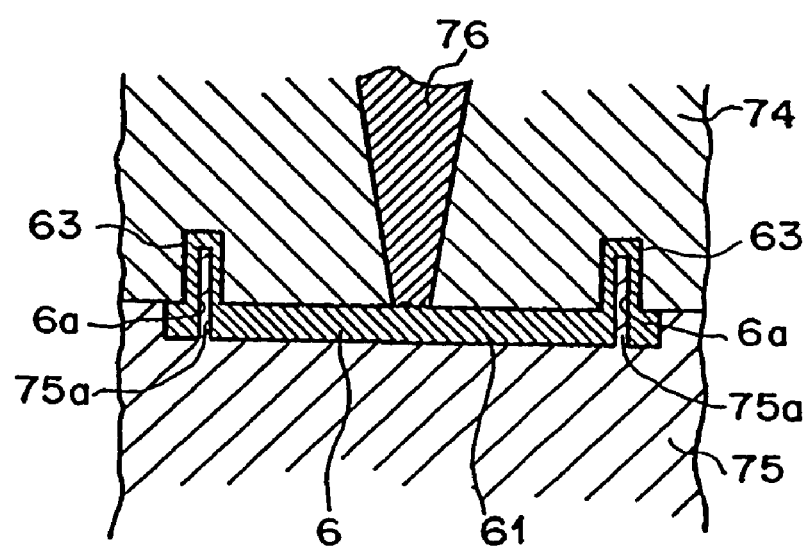
FIG. 28 is a sectional view showing another injection-molded state of the releasing member.

FIG. 27A is a diagram showing how the releasing member 6 is molded by injection molding, and FIG. 27B is an enlarged view of the essential part B in FIG. 27A. The releasing member 6 is molded by injecting resin into a space formed by a stationary metal mold 74 and a movable metal mold 75 through a gate from a runner 76. At this time, the runner 76 is connected at the rotation center position of the reel 2 to the opposite surface of the releasing member 6 from the surface which slides on the restraining member 4, and when the movable metal mold 75 is moved in order to take out a molded product after molding, the runner 76 is separated from the releasing member 6 and a gate trace 67 is formed.

Thus, by providing the gate traces 46 and 67, for injection molding, on the sliding surfaces of the restraining member 4 and the releasing member 6 in the vicinity of the center of rotation of the reel 2, there is no possibility that when the restraining member 4 and the releasing member 6 slide on each other, the sliding resistance between the restraining member 4 and the releasing member 6 will increase and powder due to wear will occur. In addition, because the gate traces 46 and 67 are provided in the vicinity of the rotation center, the flow of resin within the metal molds 71, 72, 74, and 75 becomes approximately uniform. With this uniformity, there is no possibility that the dimensional precision of the restraining member 4 and releasing member 6 will be deteriorated, and in addition, the restraining member 4 and the releasing member 6 can be manufactured satisfactorily in terms of appearance and strength.

Note that while, in the above-mentioned embodiment, the gate traces 46 and 67 are provided at the rotation center positions of the reel 2 on the restraining member 4 and the releasing member 6, there is no problem even if they are shifted slightly from the rotation center positions, if they are formed on the surfaces of the restraining member 4 and the releasing member 6 opposite to the sliding surfaces of the members 4, 6.

In addition, although, in the above-mentioned embodiment, in both of the restraining member 4 and the releasing member 6 the gate traces 46 and 67 are formed on the surfaces of the members 4 and 6 opposite from the sliding surfaces thereof, the gate trace may be formed on the surface of either the restraining member 4 or the releasing member 6 opposite to the sliding surface.

Furthermore, in the above-mentioned embodiment, while the releasing member 6 is injection-molded as shown in FIG. 27A, the pushing-up portions 63 of the releasing member 6 need to be stood up in a direction perpendicular to the plate base 61, because they are inserted into the through holes 26 and moved. However, there is a possibility that the pushing-up portions 61 cannot be precisely formed, because the plate base 61 will warp due to sinkmarks in the resin which are formed when molding the releasing member 6 by injection molding. In addition, as the gate trace 67 and the three pushing-up portions 63 are formed on the side of the stationary metal mold 74, as shown in FIG. 27A, there is a problem that (1) the sliding resistance between the releasing member 6 and the stationary metal mold 74 will become greater, (2) the releasing member 6 will be pulled toward the side of the stationary metal meld 74 when the stationary metal mold 74 and the movable metal mold 75 are opened, and (3) a molded product cannot be taken out smoothly from the metal molds 74 and 75.

Because of this, it is preferable to form a bore 6a to such an extent that it will reduce the wall thickness of the pushing-up portion 63, at a position, corresponding to the pushing-up portion 63, on the side opposite to the movable metal mold 75 of the releasing member 6. That is, a pin-shaped protruding portion 75a is formed at a position on the movable metal mold 75 which corresponds to the pushing-up portion 63, and the bore 6a is formed in the releasing member 6 when molding the releasing member 6 by injection molding. Since the position on the releasing member 6 corresponding to the pushing-up portion 63 is away from the gate, there is significant shrinkage when the resin hardens. Therefore, when the releasing member 6 hardens within the metal molds 74 and 75, the bore 6a shrinks and the holding force of the protruding portion 75a of the movable metal mold 75 develops. This prevents the releasing member 6 from being pulled by the stationary metal mold 74 when releasing the metal molds 74 and 75, making it possible to smoothly release the metal molds 74 and 75 and accordingly take-out a molded product.

In addition, sinkmarks in the resin can be prevented by making the wall thickness of the pushing-up portion 63 uniform. This can prevent the fall of the pushing-up portions 63 during molding. As a result, the dimensional precision of the pushing-up portion 63 can be enhanced.

According to this embodiment as described above, the gate traces 67 and 46 for injection molding are provided near the centers of rotation of the reel 2 on the surfaces of the restraining member 4 and the releasing member 6 opposite from the sliding surfaces thereof. Therefore, there is no possibility that with irregularities on the gate traces, the sliding resistance between the restraining member 4 and the releasing member 6 will increase and powder due to wear will occur. In addition, because the gate traces 46 and 67 are provided in the vicinity of the rotation center of the reel 2, the flow of resin within the metal molds 71, 72, 74, and 75 becomes approximately uniform. This uniform flow prevents the deterioration of the dimensional precision of the restraining member 4 and releasing member 6 and also makes it possible to manufacture the restraining member 4 and the releasing member 6 satisfactorily from the point of view in appearance and strength.

Figure 29:
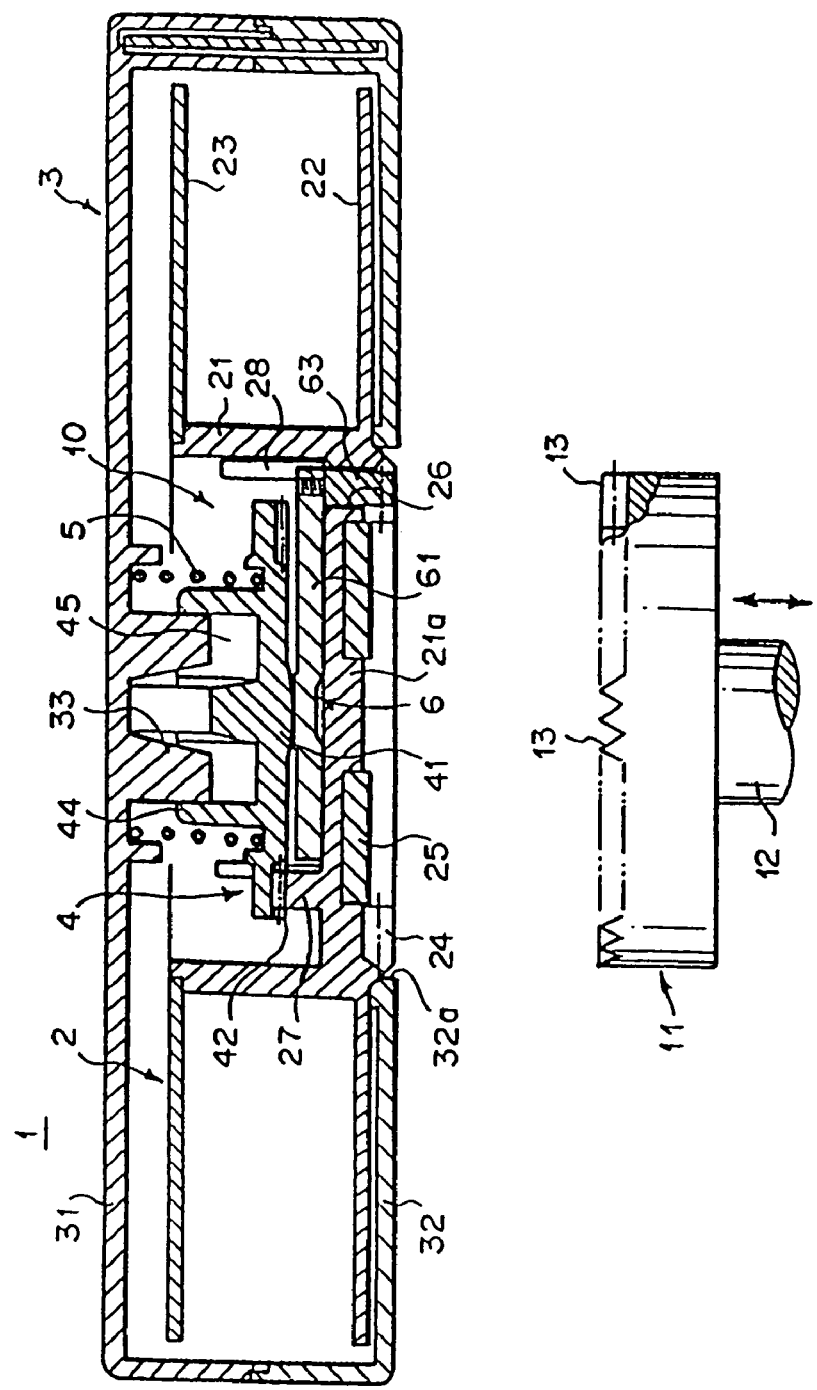
FIG. 29 is a front sectional view of a magnetic tape cartridge of a further embodiment in the non-operative condition.
Figure 30:
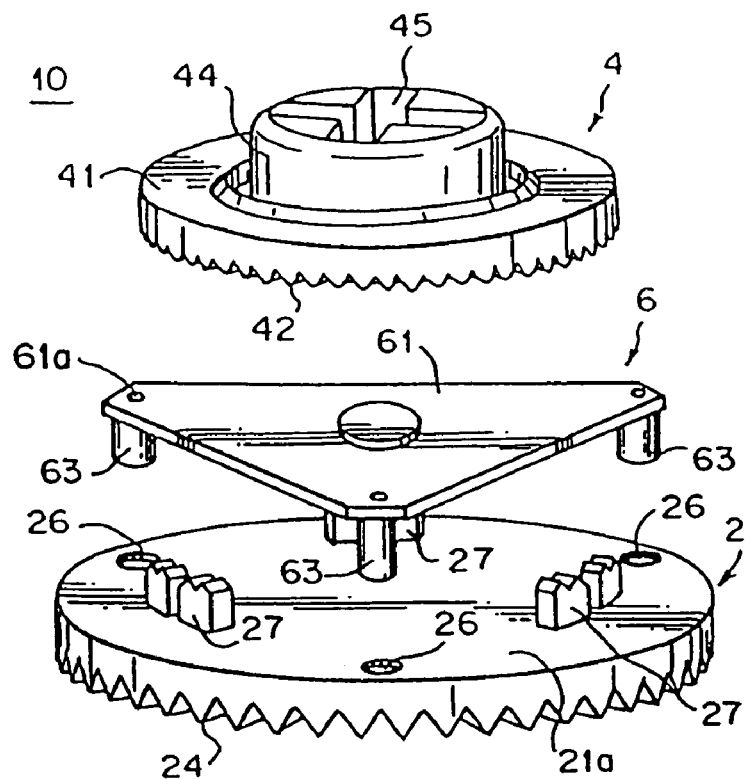
FIG. 30 is an exploded perspective view of the essential parts of the magnetic tape cartridge of FIG. 29.
Figure 31:
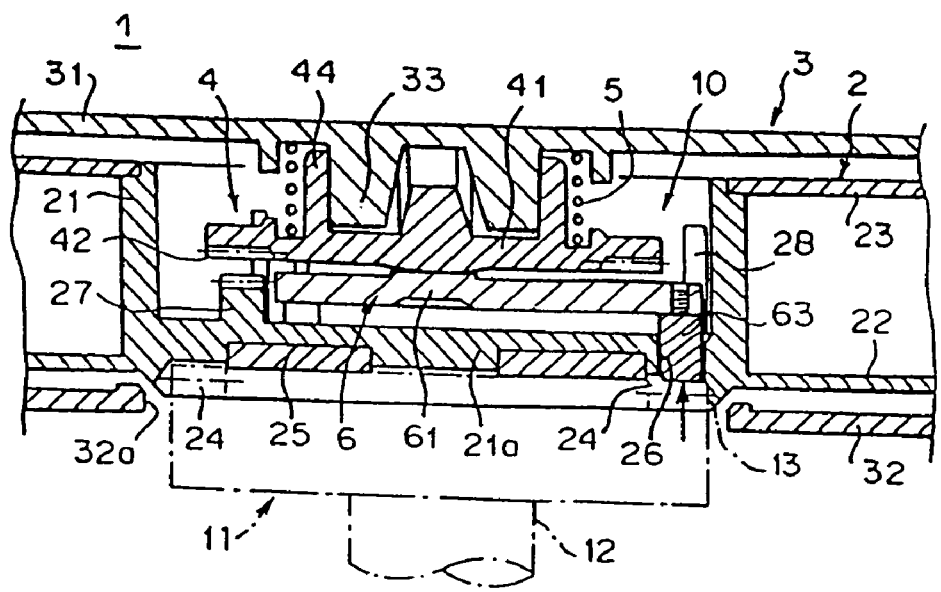
FIG. 31 is a sectional view of the essential parts of the magnetic tape cartridge of FIG. 29 in the operative condition.

Next, FIG. 29 is a sectional view of a magnetic tape cartridge of a further embodiment in the non-operative condition, FIG. 30 an exploded perspective view of the essential parts, FIG. 31 a sectional view of the essential parts in the operative condition, and FIG. 32 a plan view of a releasing member in the assembled state.

The basic structure and operation of a reel 2, a cartridge case 3, reel-rotation restraining means-10, etc., of a magnetic tape cartridge 1 in this embodiment are the same as the aforementioned embodiment, and the same reference numerals will be applied to the same parts to omit a description thereof.

The releasing member 6 of the reel-rotation restraining means 10 is provided on the lower surfaces near the vertices of a generally triangular metal plate base 61 with pushing-up portions 63 (leg portions) in the form of a column extending in the up-and-down direction, respectively.

The pushing-up portion 63 is formed with a metal processed product or a resin molded product, and as shown in FIG. 33, the corner portions of the lower end are chamfered so that no edges are formed. The upper end portion of this pushing-up portion 63 is provided with an attaching portion 63f that consists of a bar-shaped screw. The attaching portion 63f is screwed into a screw hole 61a formed in each vertex portion of the base 61 and is rigidly attached.

In addition, FIGS. 34A and 34B show other embodiments of the rigid structure for attaching the pushing-up portion 63 of the releasing member 63 to the base 61. In FIG. 34A, a snap-type attaching portion 63g is formed integrally in the upper end portion of a resin pushing-up portion 63, and the attaching portion 63g is inserted into a stepped attaching hole 61b formed in each vertex portion of the base 61 and is rigidly attached. In FIG. 34B, a metal clip-type attaching portion 63h is formed integrally in the upper end portion of the resin pushing-up portion 63, and the attaching portion 63h is inserted into a attaching hole 61c formed in each vertex portion of the base 61 and is rigidly attached.

Besides, the rigid attachment of the pushing-up portion 63 to the base 61 can adopt known methods such as press-fit, caulking (heat, welding), shrinkage fit, etc. It is preferable that for the attaching portions 63f to 63h in the pushing-up portions 63, the attaching portion in the metal pushing-up portion be formed by cutting, or by rigidly attaching a separate component. It is also preferable that for the resin pushing-up portion, the resin attaching portion be provided integrally by molding, or rigidly attached by welding, etc., or the metal attaching portion be provided by insert molding.

Figure 35:
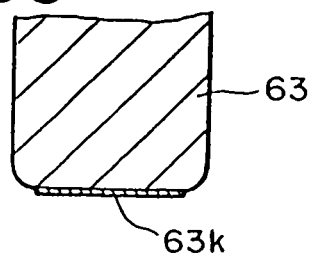
FIG. 35 is a sectional view showing the lower end portion of the pushing-up portion of a releasing member in another embodiment.

Next, FIG. 35 shows that in the case of the resin pushing-up portion 63, metal material 63k is rigidly attached to a surface of the lower end portion of the pushing-up portion 63 which contacts the driving gear 13. In this embodiment, the wear-resisting property of the resin pushing-up portion 63, which is contacted by the driving gear 13 made of metal, is enhanced. The metal material 63k is provided by attachment of a metal plate (metal foil), insert molding, etc.

In the released state in the reel-rotation restraining means 10, the pushing-up portions 63 of the lower ends of the releasing member 6 are pushed upward by the driving gear 13, while the urging force of the urging member 5 acts downward through the restraining member 4 and therefore bending deformation will easily develop in the base 61. However, since this base 61 is formed from metal, bending deformation becomes smaller. The pushing-up portion 63 can also be precisely attached by a separate member. Therefore, the pushing-up portion 63 can linearly move into and out of the through hole 26 with stability without contacting one side of the through hole 26, and the engagement of the restraining gear 41 and the stopper protrusions 27 can be reliably released by moving the restraining member 4 by a predetermined amount of stroke. In addition, because the thickness of the releasing member 6 can be reduced, an amount of stroke for movement can be sufficiently assured. Furthermore, the driving gear 13 is capable of smoothly abutting the pushing-up portion 63, and there is no possibility that the driving gear 13 will be caught on the edge portion.

Note that if the driving gear 13 is made of metal and the tooth edge is sharp, it will wear the pushing-up portion 63 when it abuts the pushing-up portion 63, and therefore, the driving gear 13 made of metal will be disadvantageous in terms of durability. Because of this, it is preferable to form the tooth edge of the driving gear 13 into a curved surface, as shown in FIGS. 36, 37A, and 37B.

Figure 36:
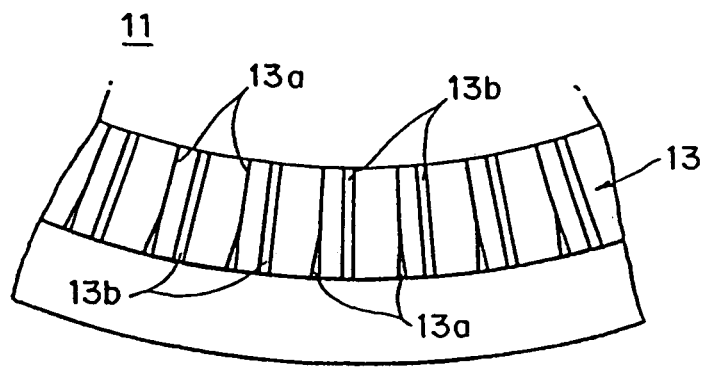
FIG. 36 is a plan view of the essential part of a driving gear.
Figure 37A:
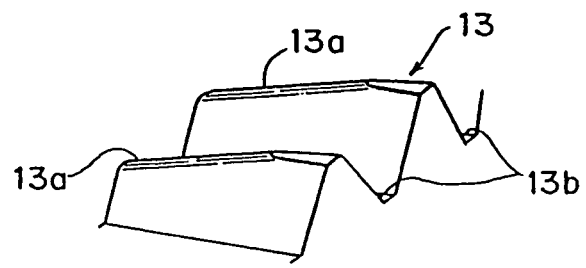
FIG. 37A is a perspective view showing an example of the tooth edge shape of FIG. 36.
Figure 37B:
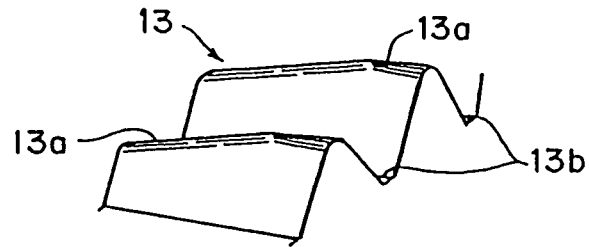
FIG. 37B is a perspective view showing another example of the tooth edge shape of FIG. 36.

In FIGS. 36, 37A, and 37B, the tooth edge portion 13a of the driving gear 13, as a shape of facilitating metal cutting of the driving gear 13, is formed so that the edge is flat at the radially outer portion and sharp and low in height at the radially inner portion, the angles of the tooth side faces differ at both sides, and the tooth groove 13b is formed wide. In the form shown in FIG. 37A, the edge of the tooth edge portion 13a on the radially inner side which becomes sharp is formed into a curved surface (R-surface) by chamfering, whereby damage to the reel gear 24 which meshes with this driving gear 13 and damage to the lower end of the pushing-up portion 63 of the releasing member 6, which will occur when they abut each other, are alleviated. Similarly, in the form of FIG. 37B, the radially outer flat edge of the tooth edge portion 13a, as with the radially inner side, is formed into a curved surface (R-surface) by chamfering.

Furthermore, in the case where the reel gear 24 formed in the reel 2 has the same gear shape as the driving gear 13, the tooth edge may likewise be formed into a curved surface (R-surface) by chamfering.

FIGS. 38 and 39 show a gear shape example of the reel gear 24. The top of the tooth edge portion 24a is formed into a flat surface at the radially inner and outer portions so that a sharp edge portion is not formed. The angles of the tooth side faces of this reel gear 24 differ at both sides, the tooth groove 24b is formed wide and deep, and the flat face of the tooth edge portion 24b is formed so that the radially inner and outer widths are approximately the same. This can increase the strength of the reel gear 24 made of resin and prevent the tooth from breaking when it meshes the driving gear 13 made of metal. Note that the driving gear 13 may likewise be formed so that the top of the tooth edge portion is flat.

According to this embodiment such as the aforementioned, the base 61 of the releasing member 6 is made of metal, while the pushing-up portion 63 is formed as a separate body and rigidly attached to the base 91. Therefore, the releasing member 6 is enhanced in dimensional precision and rigidity, and the bending deformation is reduced. The sliding motion of the pushing-up portion 63 within the through hole 26 can also be assured. Since stable movement of the releasing member 6 can be performed, the restraining member 4 can be reliably released with a predetermined amount of movement, and the operational reliability of the reel-rotation restraining means 10 can be assured.

In addition, if at least the lower end portion of the pushing-up portion 63 is made of metal, the durability to the pressing action on the lower end of this pushing-up portion is enhanced.

Figure 40A:
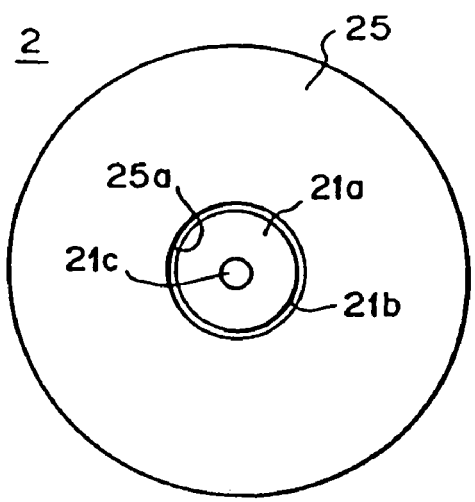
FIG. 40A is a bottom view of the essential part of a reel in another embodiment.

Next, an embodiment related to the reel and the manufacturing method will be described. FIG. 40A shows a bottom view of the reel plate 25 (metal plate) of the bottom center of the reel 2, and FIG. 40B shows a sectional view of the molded state.

The reel plate 25 is formed into an annular shape having a center hole 25a. In the molded state with the reel plate 25 inserted into the bottom wall 21a of the reel 2, the part of the center hole 25a is closed by the resin of the bottom wall 21a, and so as the reel gear 24 is provided to project from the plate surface.

Figure 40B:
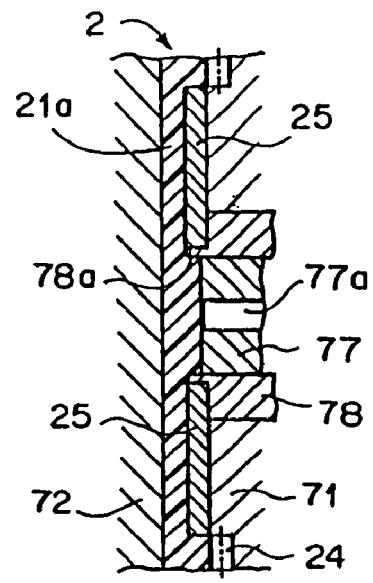
FIG. 40B is a sectional view of the injection-molded state of the reel shown in FIG. 40A.

Injection molding of the reel 2, as shown in FIG. 40B, is performed by injecting resin into a cavity formed by a stationary metal mold 71 and a movable metal mold 72 through the gate 77a of a gate bush 77. The gate bush 77 is disposed in the center portion of the stationary metal mold 71, and a hold member 78 to hold the inner peripheral surface of the reel plate 25 is disposed on the outer periphery of the gate bush 77. The hold member 78 is tubular in cross section and provided at the lower end with a ring protrusion 78a. The inner peripheral surface of the center hole 25a of the reel plate 25 is fitted onto the outer peripheral surface of the ring protrusion 78a. This reel plate 25 is held with the plate surface being in intimate contact with an inner surface which is at a predetermined position on the metal mold 71. In this manner, the movable metal mold 72 is closed, and resin is injected.

After molding, the hold trace 21b of the ring protrusion 78a of the hold member 78 is formed as a ring groove in the reel 2, at the part of the bottom wall 21a closing the center hole 25a of the reel plate 25. In addition, a gate trace 21c is formed in the center portion.

If insert molding is performed with the inner peripheral surface of the center hole 25a of the reel plate 25 held by the above-mentioned hold member 78, the reel plate 25 can be prevented from moving and shifting out of position because of the flow of resin, and therefore, the reel plate 25 can be rigidly attached at a predetermined position on the reel 2. In addition, all that is required at the time of wear is to change components, because the hold member 78 is formed as a member separate from the stationary metal mold 71 and the gate bush 77.

Figure 41A:
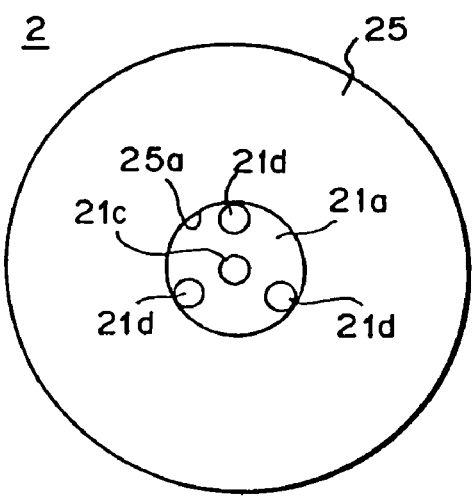
FIG. 41A is a bottom view of the essential part of a reel in still another embodiment.
Figure 41B:
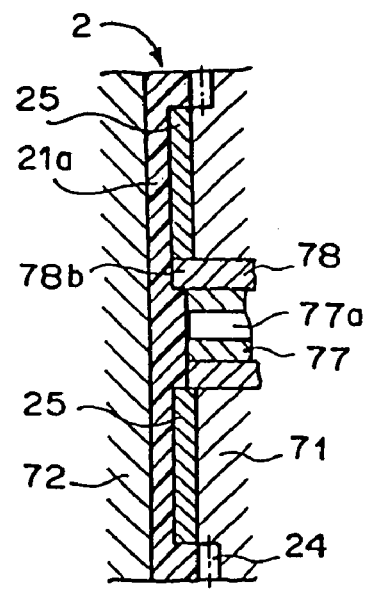
FIG. 41B is a sectional view of the injection-molded state of the reel shown in FIG. 41A.

FIG. 41A shows another embodiment of the structure for holding the reel plate 25 and FIG. 41B the molded state. In this example, the lower end of the hold member 78 for holding the reel plate, provided in the stationary metal mold 71, has a pin structure.

That is, the hold member 78 is tubular in cross section, and three or more hold pins 78b (in the figure, 3 pins) project from the lower end. The outer peripheral surfaces of the hold pins 78b abut the inner peripheral surface of the center hole 25a of the reel plate 25, whereby this reel plate 25 is held with the plate surface being in intimate contact with an inner surface which is at a predetermined position on the metal mold 71. In this way, the movable metal mold 72 is closed, and injection molding is performed by injecting resin from the gate 77a.

In the reel 2 after molding, three hold traces 21d in the form of a recess are formed in the bottom wall 21a, integrally formed inside the center hold 25a of the reel plate 25, and at the center portion, a gate trace 21c is formed. In the holding by the hold pins 78b, even if the hold pins 78b are projected from the reel plate 25, the projection has little influence on the flow of resin injected from the gate 77a. Therefore, the amount of projection of the hold pins 78b may be increased in order to enhance the function of holding the reel plate 25.

Figure 42:
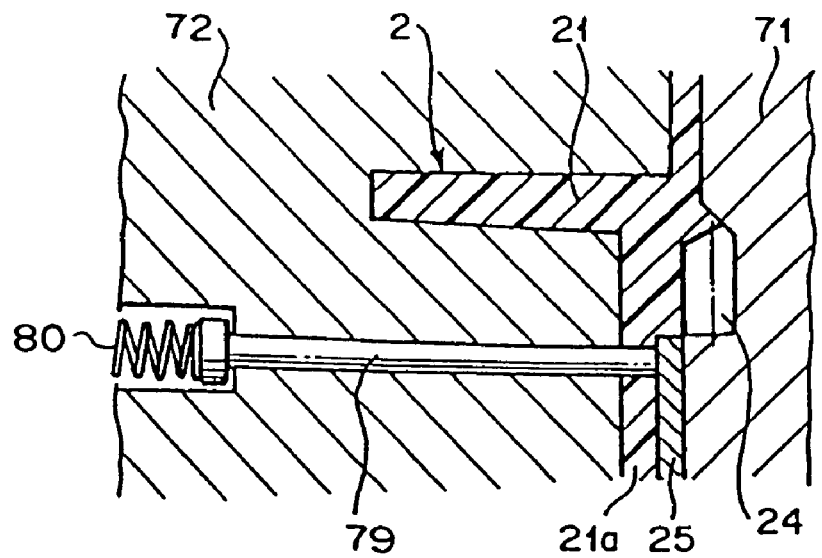
FIG. 42 is a sectional view of an injection-molded state showing another embodiment of the structure for locking a reel plate.

Next, FIG. 42 shows another embodiment of the metal mold. The reel plate 25 placed on the stationary metal mold 71 is pressed and locked by a movable pin 79, urged by a spring 80 provided in the movable metal mold 72. In this locked state, injection molding is performed by injecting resin.

This prevents the reel plates 25 from being moved by the flow of resin at the time of injection, whereby molding of the reel 2 can be performed with the reel plate 25 attached at a predetermined position. In addition, although a pin hole is formed in the reel bottom wall 21a by the movable pin 79, it is closed by the reel plate 25 and therefore dustproof property can be assured. Note that in addition to the holding of the reel plate 25 by the hold member 78 shown in FIG. 40B or 41B, the pressing and locking by the movable pin 79 may be performed.

Figure 43:
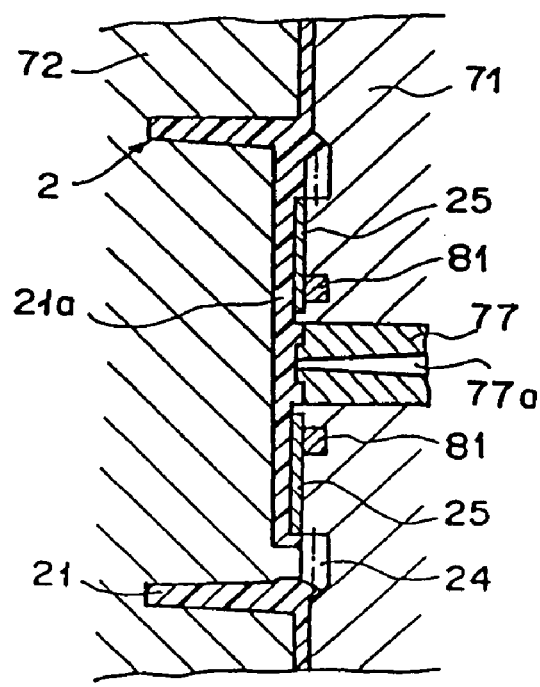
FIG. 43 is a sectional view of an injection-molded state showing still another embodiment of the structure for locking a reel plate.

FIG. 43 shows still another embodiment regarding the locking of the reel plate 25. In this example, the reel plate 25 is held in a predetermined position on the stationary metal mold 71 by magnetic force.

That is, a magnet 81 is disposed on the outer peripheral portion of the gate bush 77 of the stationary metal mold 25 so that it is coplanar with the metal mold surface. The reel plate 25 is attracted and held with the magnetic force of the magnet 81, and insert molding is performed.

Next, various forms of reel plates 25, for enhancing the rigid attachment force of the reel 2 to the bottom wall 21a, will be shown.

Figures 44A, 44B, 44C:
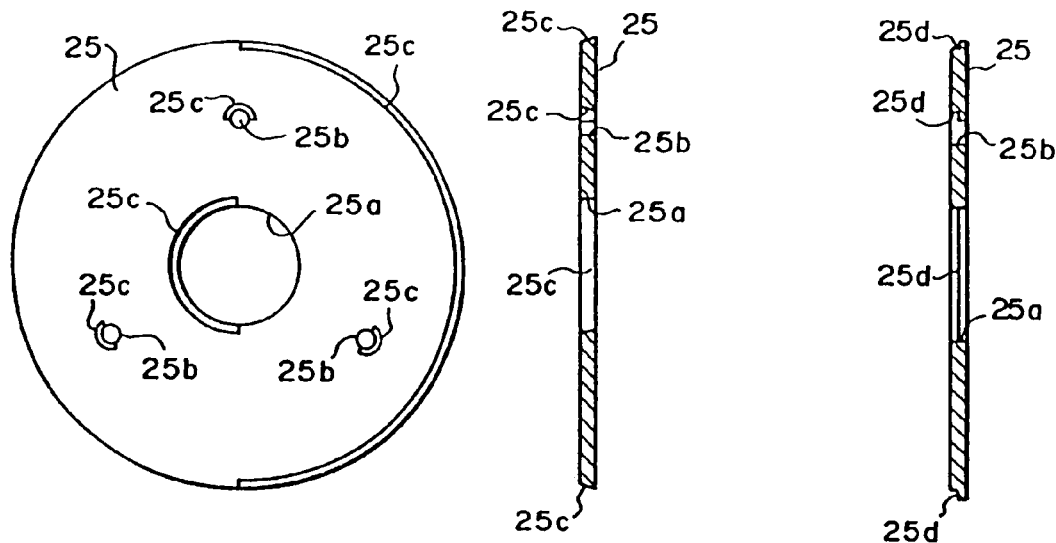
FIG. 44A is a front view showing another embodiment of the reel plate.
FIG. 44B is a sectional view of FIG. 44A.
FIG. 44C is another sectional view of FIG. 44A.

The reel plate 25 shown in FIG. 44A has a center hole 25a. Also, three rigid-attachment holes 25b are bored in the flat portion, and taper portions 25c such as those shown in FIG. 44B, or stepped portions 25d such as those shown in FIG. 44C, are formed over the respective half peripheries of the outer peripheral portion, the inner peripheral portion of the center hole 25a, and the inner peripheral portion of the rigid attachment hole 25b.

The insert molding of the aforementioned reel plate 25 is performed with the surface of FIG. 44A being in intimate contact with the inner surface of the stationary metal mold 71, and the taper portions 25c or stepped portions 25d are also filled with resin in order to enhance the rigid attachment force of the reel plate 25, whereby the disengagement of the reel plate 25 from the reel is prevented. In addition, higher rigid attachment force is obtained by boring the rigid-attachment holes 25b.

Figures 45A, 45B:
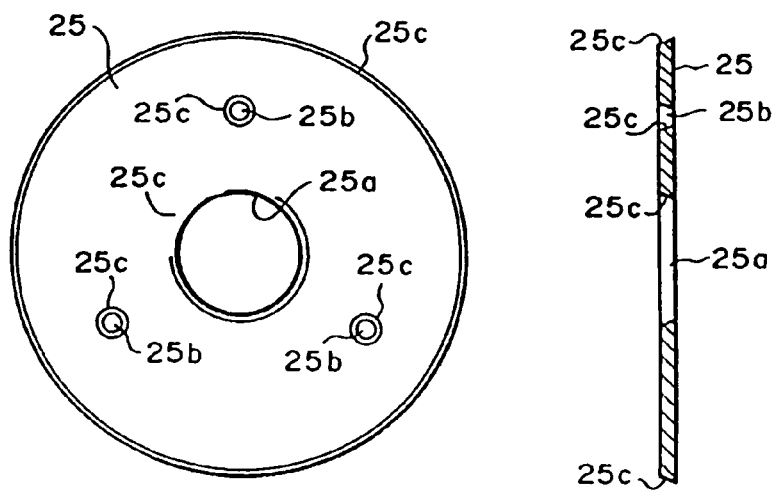
FIG. 45A is a front view showing still another embodiment of the reel plate.
FIG. 45B is a sectional view of FIG. 45A.

A center hole 25a and rigid-attachment holes 25b (three holes) are bored, in the reel plate 25 shown in FIGS. 45A and 45B, and taper portions 25c are formed over the respective whole peripheries of the outer peripheral portion, the inner peripheral portion of the center hole 25a, and the inner peripheral portion of the rigid-attachment hole 25b.

Figure 46A:
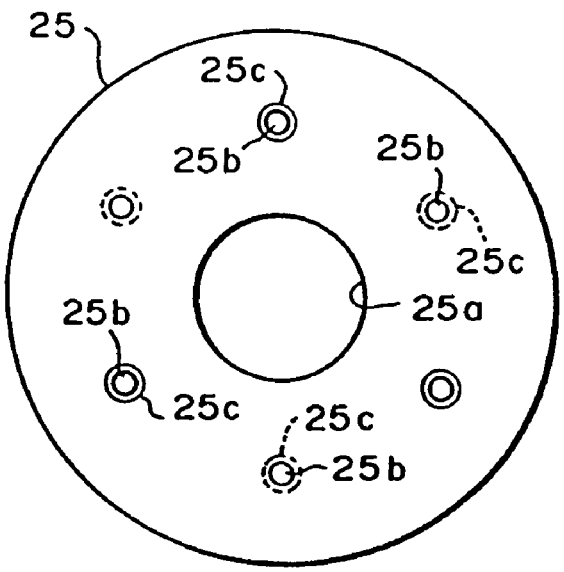
FIG. 46A is a front view showing another embodiment of the reel plate.
Figure 46B:
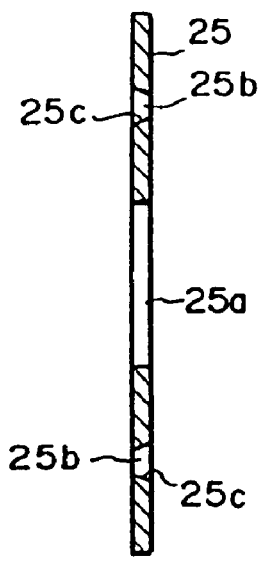
FIG. 46B is a sectional view of FIG. 46A.

A center hole 25a and rigid-attachment holes 25b (six holes) are bored, in the reel plate 25 shown in FIGS. 46A and 46B, and taper portions 25c are formed over the respective whole peripheries of the inner peripheral portions of the rigid-attachment holes 25b. The directions of the taper portions 25c are alternated on three of the holes 25b so that both sides of the reel plate 25 become symmetrical in shape, whereby interchangeability between both sides is provided. This eliminates the necessity for selecting the upper or lower side of the reel plate 25 when setting it to the metal mold 71, whereby operability is enhanced.

Figure 47A:
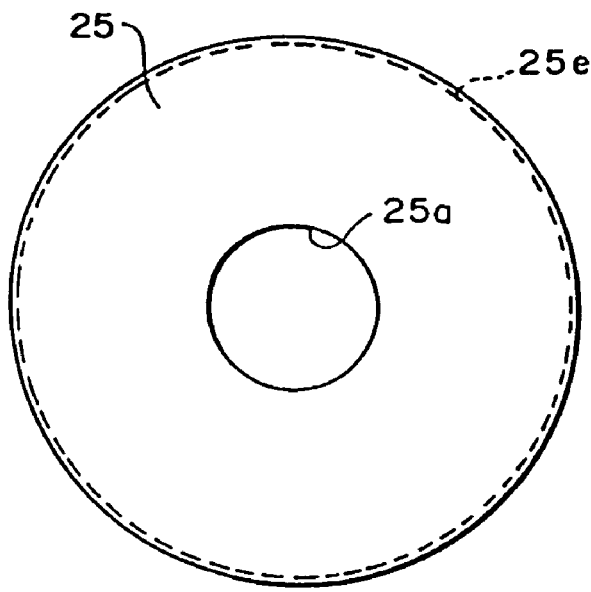
FIG. 47A is a front view showing still another embodiment of the reel plate.
Figure 47B:
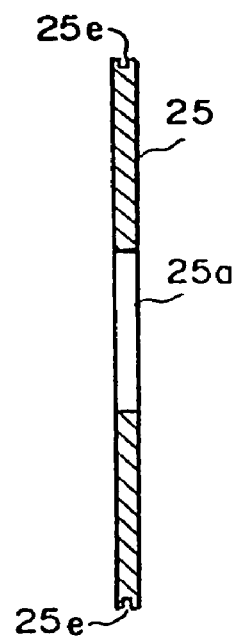
FIG. 47B is a sectional view of FIG. 47A.

An annular groove 25e is formed in the outer peripheral surface in the reel plate 25 shown in FIGS. 47A and 47B. This groove 25e is filled with resin, whereby rigid attachment force increases.

Rigid attachment grooves 25f in undercut form are formed in the surface of the reel plate 25, shown in FIGS. 48A and 48B, which contacts resin. The rigid attachment grooves 25f in undercut form are filled with resin, whereby rigid attachment force increases.

Note that in the case where the rigid-attachment hole 25b is bored in the reel plate 25, as previously described, the gate position for injection molding may be provided in the part of the rigid-attachment hole 25b.

Next, FIGS. 49 through 52 show various forms of the reel plate 25 and the reel gear 24 formed in the outer periphery. In these forms, when the molded reel 2 is separated by the metal mold 71, the interference between the gear portion metal mold for molding the reel gear 24 and the reel plate 25 is prevented.

The form shown in FIG. 49 forms a clearance (which is filled with resin) in the radial direction between the outer peripheral surface of the reel plate 25 and the inner peripheral end of the reel gear 24, thereby preventing the interference between the reel plate 25 and the gear portion metal mold when separating the mold from the plate.

The form shown in FIG. 50 forms a clearance in the height direction between the height position of the outer peripheral end of the reel plate 25 and the height of the tooth bottom portion of the reel gear 24, thereby preventing the aforementioned interference.

The form shown in FIG. 51 inclines the outer peripheral surface of the reel plate 25 and forms a clearance between the corner portion of the outer periphery of the reel plate 25 and the tooth bottom portion of the reel gear 24, thereby preventing the aforementioned interference.

The form shown in FIG. 52 chamfers the inner end portion of the gear portion metal mold, which molds the tooth bottom portion of the reel gear 24, and forms a clearance between the chamfered portion and the outer peripheral end of the reel plate 25, thereby preventing the aforementioned interference.

According to this embodiment, as described above, for the insert molding of the annular reel plate 25 having the center hole 25a at the bottom surface of the reel 2, the hold trace 21b or 21d in the form of a recess, which is formed by the hold member 78 of the metal mold holding the reel plate 25, is formed in the reel bottom wall 21a closing the center hole 25a of the reel plate 25 with resin. Therefore, the holding of the reel plate 25 during insert molding can be reliably performed, and desired insert molding can be performed without movement of the reel plate 25 which is caused by the pressure and flow of resin at the time of injection molding. Also, there is no possibility that the reel plate 25 in the reel 2 after molding will project, and therefore, interference with other components can be prevented. In addition, the center hole 25a is closed, whereby dustproof property can be easily assured.

In addition, according to the aforementioned molding method, the reel plate 25 is held during insert molding by the movable pin 79 provided in the metal mold, or by magnetic force. Therefore, the holding of the reel plate 25 to the metal mold can be reliably performed without forming a through hole in the molded reel 2, and the reel plate 25 can be formed integrally at a predetermined position on the reel 2.

Figure 53A:
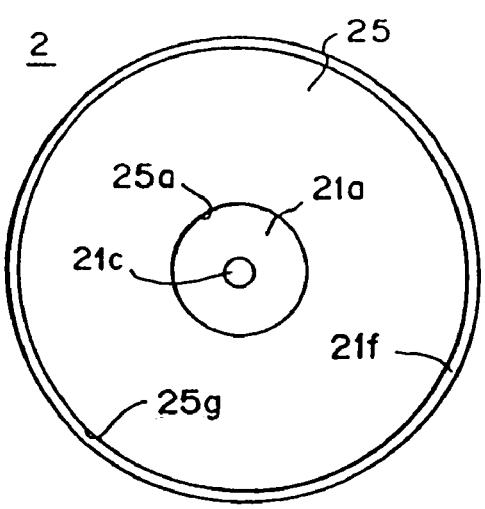
FIG. 53A is a bottom view of the essential part of a reel in another embodiment.

Next, another embodiment of the insert molded portion of the reel plate 25 will be shown. FIG. 53A shows a bottom view of the reel plate 25 of the bottom center portion of the reel 2 and FIG. 53B a sectional view of the molded state.

The aforementioned reel plate is formed into an annular shape having a center hole 25a. In the molded state with reel plate 25 inserted into the bottom wall 21a of the reel 2, the part of the center hole 25a is closed by the resin of the bottom wall 21a, and outside an outer peripheral surface 25g, a clearance 21f in the form of a circumferential groove is formed between the outer peripheral surface 25g and the reel bottom wall 21a surrounding this. Outside the clearance 21f, a reel gear 24 is provided.

Figure 53B:
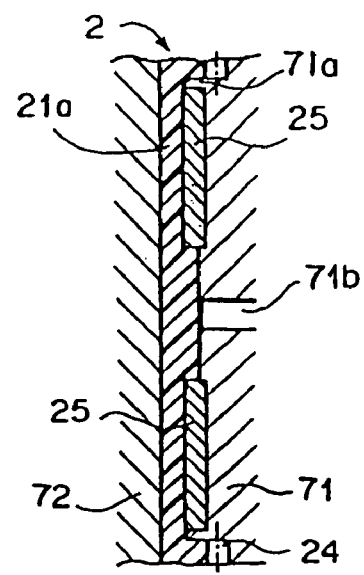
FIG. 53B is a sectional view of the injection-molded state of the reel shown in FIG. 53A.

Injection molding of the reel 2, as shown in FIG. 53B, is performed by injecting resin into a cavity formed by a stationary metal mold 71 and a movable metal mold 72 through a gate 71b. The stationary metal mold 71 is provided with a ring protrusion 71a for holding the outer peripheral surface of the reel plate 25. The outer peripheral surface 25g of the reel plate 25 is fitted into the inner peripheral surface of the ring protrusion 71a, and this reel plate 25 is held on an inner surface which is at a predetermined position on the metal mold 71. The movable metal mold 72 is closed, and resin is injected.

In the reel 2 after molding, at the part of the bottom wall 21a of the outer peripheral surface 25g of the reel plate 25, a clearance 21f in the form of a circumferential groove, which results from the hold trace of the ring protrusion 71a, is formed in recess form. In addition, a gate trace 21c is formed in the center portion of the bottom wall 21a that closed the center hole 25a.

If insert molding is performed with the outer peripheral surface 25g of the reel plate 25 held by the above-mentioned ring protrusion 71a, the reel plate 25 can be prevented from moving and shifting out of position because of the flow of resin, and therefore, the reel plate 25 can be rigidly attached at a predetermined position on the reel 2. In addition, because of formation of the clearance 21f, the shrinking force resulting from the shrinkage of resin after insert molding will not act on the outer peripheral surface 25g and therefore deformation of the reel plate 25 can be suppressed.

Figure 54:
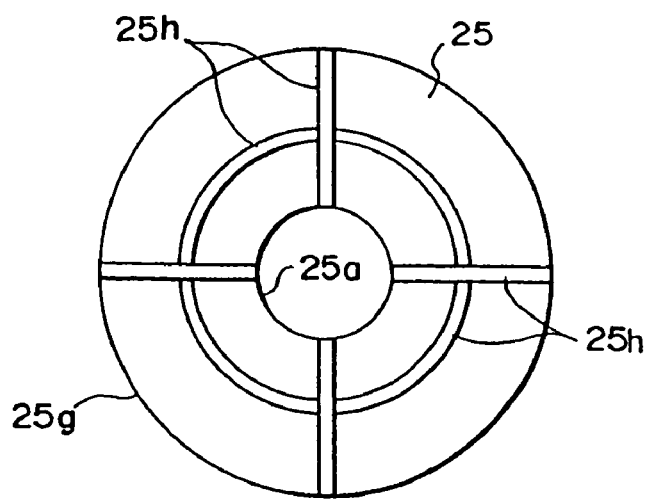
FIG. 54 is a plan view showing another embodiment of the reel plate.

FIG. 54 shows another embodiment of the reel plate 25. Reinforcement ribs 25h are formed on the upper surface of the reel plate 25 that contacts the reel bottom wall 21a. These reinforcement ribs 25h are formed by radial and ring ribs projecting from the plate surface. Note that the lower surface of the reel plate 25 which is exposed to the bottom surface of the reel 2 has no reinforcement rib and is provided flat. Also, the form of the reinforcement rib 25h is designed and changed as appropriate, according to the required strength.

Such a reel plate 25 is insert-molded integrally with the reel 2, while it is being held by the aforementioned stationary metal mold 71 (the ring protrusion 71a is not always a necessity).

According to the form shown in FIG. 54, even if the bending strength of the reel plate 25 increases and the shrinking force of the resin forming the reel bottom wall 21a after insert molding acts on the reel plate 25, the deformation will be suppressed by formation of the reinforcement ribs 25h.

Figure 55:
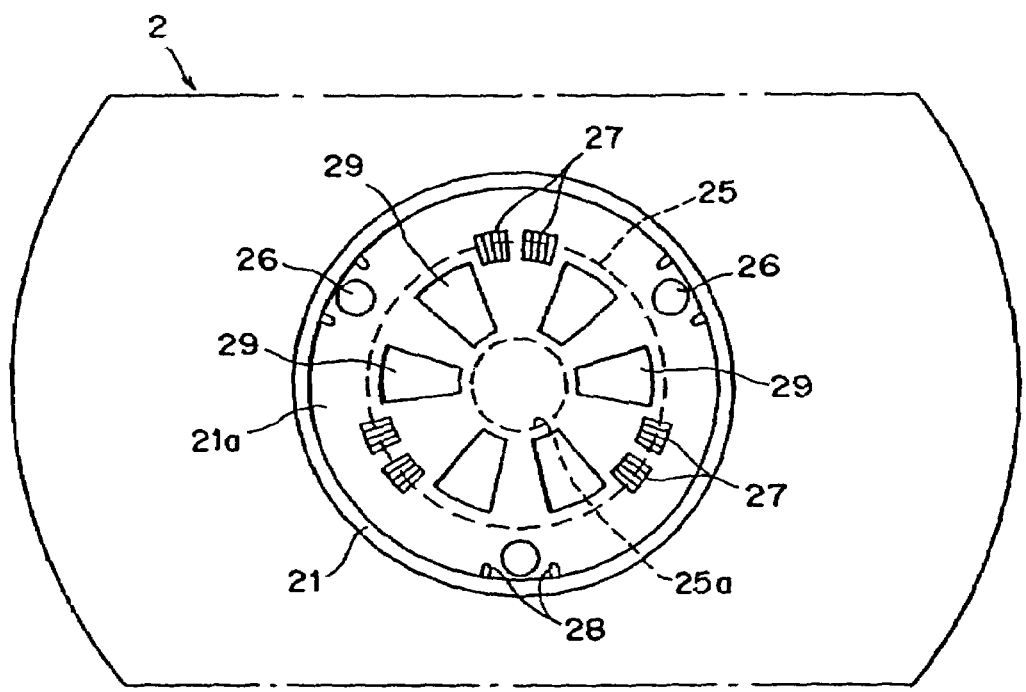
FIG. 55 is a plan view showing another embodiment of the reel.

Next, FIG. 55 is a plan view showing another embodiment of the reel 2. As previously described, the reel plate 25 is rigidly attached to the bottom surface of the bottom wall 21a of the reel hub 21. In the bottom wall 21a of the reel 2 which contacts the upper surface of the reel plate 25, recesses 29 are formed and resin contacting the upper surface of the reel plate 25 is partially removed. That is, the surface of the aforementioned movable metal mold 72 is molded in contact with the reel plate 25 so that the bottom wall 21a is in an open state at the parts of the recesses 29 and the upper surface of the reel plate 25 is exposed to the bottom surfaces of the recesses 29.

Note that in formation of the recesses 29, the aforementioned gate 71b is located at the center portion of the reel bottom wall 21a and it is therefore necessary to form the recesses 29 with spaces so that resin injected from this gate portion flows uniformly to each part, and particularly so that a flow in the radial direction is not disturbed. In addition, the recesses 29 may be formed to reduce the wall thickness of the reel bottom wall 21a.

According to the form shown in FIG. 55, the recesses 29 are formed in the reel bottom wall 21a contacting the reel plate 25, whereby the amount of the resin contacting the reel plate 25 is reduced and the shrinking force of the resin after insert molding becomes smaller. As a result, deformation of the reel plate 25 can be suppressed.

According to this embodiment as described above, for the insert molding by which the reel plate 25 for magnetic attraction is molded integrally to the bottom surface of the reel 2, a clearance is formed between the outer peripheral surface of the reel plate 25 and the reel bottom wall 21a surrounding this. Therefore, no shrinking force acts from the outer peripheral surface to the center direction when resin after insert molding is shrunk, deformation of the reel plate 25 can be suppressed and therefore a uniform clearance with the magnet can be assured. With formation of the clearance 21f in the outer periphery of the reel plate 25, the reel plate 25 is held by the protrusion 71a of the metal mold corresponding to this clearance 21f, whereby positioning of the reel plate 25 during insert molding can be performed with reliability and desired insert molding can be performed without movement of the reel plate 25 that is caused by the pressure and flow of resin at the time of injection molding.

In addition, in the example where the reinforcement ribs 25h are provided on the surface of the reel plate 25 which contacts the reel bottom wall 21a, deformation of the reel plate 25, which is caused by an increase in the strength of the reel plate and the shrinking force of resin when shrunk after insert molding, can be suppressed and therefore a uniform clearance with the magnet can be assured.

Furthermore, in the example wherein the bottom wall 21a of the reel 2 contacting the reel plate 25 is partially removed, the shrinking force pulling the reel plate surface in the center direction, which develops as resin shrinks after insert molding, is reduced. As a result, deformation of the reel plate 25 can be suppressed, whereby a clearance with the magnet can be assured.

Figure 56:
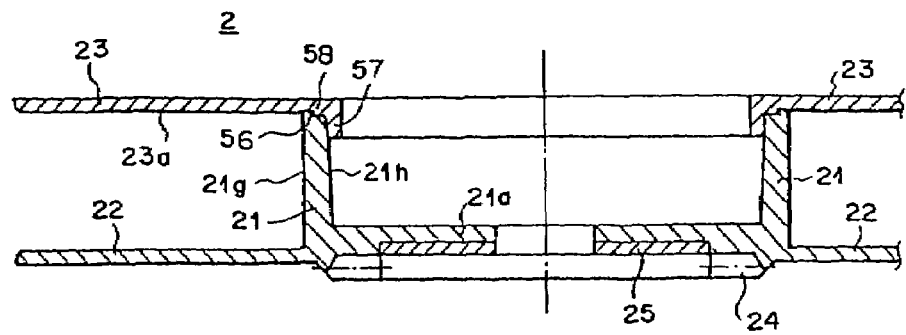
FIG. 56 is a sectional view of a reel according to still another embodiment.

Next, an embodiment regarding formation of the tape reel will be shown. FIG. 56 is a sectional view of the reel and FIG. 57 an enlarged view of the essential part.

On the reel 1, a cylindrical reel hub 21 in which magnetic tape is wound on the outer peripheral surface 21, and a lower flange portion 22 projecting in disk form in the radial direction from the outer periphery of one end portion (in the figure, lower end portion) of this reel hub 21, are integrally formed from synthetic resin, and an upper flange portion 23 in the form of a disc, formed as a separate body by synthetic resin, is rigidly attached to the other end portion of the reel hub 21 by an adhesive.

A disc bottom wall 21a is continuous to the inner peripheral portion of the reel hub 21, and in the outside surface of this bottom wall 21a, a reel gear 24 for driving the reel 1 to rotate is formed in ring form. Furthermore, on the radially inner side from this real gear 24, a real plate 25 for magnetic attraction, made of an annular metal plate, is inserted when molded.

Figure 57:
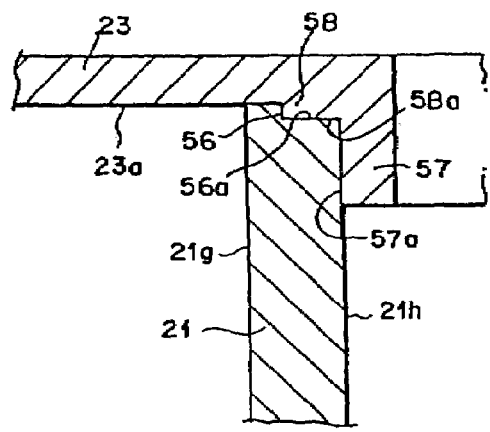
FIG. 57 is an enlarged view of the essential part of the reel of FIG. 56.

Moreover, in the end surface of the reel hub 21 to which the upper flange portion 23 is rigidly attached, a stepped portion 56, recessed in ring form so that a portion on the side of the inner peripheral surface 21h becomes lower in height, is formed as shown in FIG. 57. Also, the end surface 56a of the stepped portion 56 in this reel hub 21 and the end portion of the hub inner peripheral surface 21h become adhesion surfaces.

On the other hand, the upper flange portion 23 has a circular opening at the central portion, and at the circumferential margin of this opening, a collar portion 57 is formed projecting in the direction perpendicular to a flange surface 23a. As shown in FIG. 57, the corner portion between this collar portion 57 and the flange surface 23a is formed into an annular protruding portion 58 which fits on the stepped portion 56 of the reel hub 21. Also, the end surface 58a (surface parallel with the flange surface 23a) of the annular protruding portion 58 in this upper flange portion 23 and the outer peripheral surface 57a of the collar portion 57 become adhesion surfaces.

For the adhesion between the reel hub 21 and the upper flange portion 23, an adhesive is supplied in a predetermined amount to the adhesion surface of the reel hub 21 and/or the adhesion surface of the upper flange portion 23 by supply means such as a dispenser, etc. While both are being positioned, the collar portion 57 of the upper flange portion 23 is inserted onto the inner peripheral surface 21h of the reel hub 21, and the annular protruding portion 58 is fitted and assembled on the stepped portion 56. The outer peripheral surface 57a of the flange collar portion 57 and the inner peripheral surface 21h of the reel hub 21 are joined at a surface parallel (or may be inclined at an angle of about 1 to 10°) to the axis of rotation of the reel hub 21, and the end surface 58a of the annular protruding portion 58 and the end surface 56a of the stepped portion 56 are joined at a surface perpendicular to the rotation axis of the reel hub 21.

As the adhesive, a wide variety of adhesives are usable. However, it is preferable to use a light hardening type adhesive, particularly an ultraviolet ray hardening type adhesive or a visible light hardening type adhesive. In the case of this light hardening type adhesive, the adhesive is applied to an adhesion surface and is then hardened by irradiating light (ultraviolet ray, visible light) for a predetermined time period (e.g., 5 sec). In this manner, the adhesion process ends.

The ultraviolet ray hardening type adhesive uses, for example, a known one which has an acryloyl group to a few acryloyl groups as a functional group and also has a composition that makes a radical polymerization reaction with a photo polymerized monomer, etc., by ultraviolet rays and is bridged and polymerized. For instance, there are 3-BONDs 3062, 3055, 3065 (3-Bond), ALONE-TIGHTs BU-130U, BU-230U, BU-249U (Toagosei), etc. The aforementioned ultraviolet ray hardening type adhesive may be equipped with a given hardening property such as anaerobic hardening, primer hardening, etc. These adhesives are hardened in a few seconds to tens of seconds when irradiated with ultraviolet rays of wavelength 200 to 400 nm. In this case it is preferred to mold the upper flange portion 23 or reel hub 21 with transparent resin such as polycarbonate (PC), polystyrene (PS), etc. However, resin does not always need to be transparent, because there is a type in which adhesion surfaces are combined together after irradiation of ultraviolet rays.

As a visible light hardening type adhesive, there are ALONE-TIGHTs VL-1303, VL-2303, VL-5303, etc. These can be used for adhesive even when the upper flange portion 23 or reel hub 21 is semitransparent or slightly colored.

In the above-mentioned embodiments, in order to enhance the adhesive strength of an adhesive, at least one of the adhesion surfaces in the adhesion portion between the end surface 56a of the stepped portion 56 of the reel hub 21 and the end surface 58a of the annular protruding portion 58 in the upper flange portion 23 and the adhesion portion between the end portion of the hub inner peripheral surface 21h and the outer peripheral surface 57a of the collar portion 57 of the upper flange portion 23 is roughened as occasion demands. Roughening of this adhesion surface is obtained by roughening the surface of the adhesion-surface molding portion of the metal mold for the reel hub 21 or upper flange portion 23, and it is preferable that the surface roughness be 1 μm or more in terms of Rz.

According to this embodiment, the reel hub 21 and the upper flange portion 23 are joined by an adhesive. As a consequence, adhesion can be uniformly performed over the whole periphery without giving rise to deformation in the upper flange portion 23. The reel 1 after rigid attachment can be formed with dimensional precision corresponding to molding precision. The upper flange portion 23 can be rigidly attached perpendicular to the rotation axis of the reel hub 21. When this reel 1 is being rotated to forward or rewind magnetic tape, the deflection of the rotation of the upper flange portion 23 is small and lateral fluctuation in magnetic tape being traveled is also small. Therefore, satisfactory positional precision is obtained, an influence on recording and reproducing characteristics is small, and in addition, it becomes possible to meet the high-density requirement of the magnetic tape cartridge.

In addition, the adhesion between the reel hub 21 and the upper flange portion 23 is performed at a position away from the outer peripheral surface 21g of the reel hub 21, and on the radially inner side from the stepped portion 56. As a result, the adhesive is prevented from overflowing from the adhesion surface to the part of the outer peripheral surface 21g, and the influence of the adhesive on the magnetic tape that is wound on this outer peripheral surface 21g can be eliminated.

Furthermore, if the adhesion surface is roughened, the adhesion area to which an adhesive is applied is increased and the adhesive strength is enhanced. As a result, the adhesion between the reel hub 21 and the upper flange portion 23 can be more firmly performed, and the adhesion surface can endure an increase in the winding tension without increasing the adhesion area.

Although, in the above-mentioned embodiment, adhesion is performed at two surfaces perpendicular to each other in order to obtain high adhesive strength, at least the adhesion between the outer peripheral surface 57a of the collar portion and the hub inner peripheral surface 21h is necessary.

Figure 58:
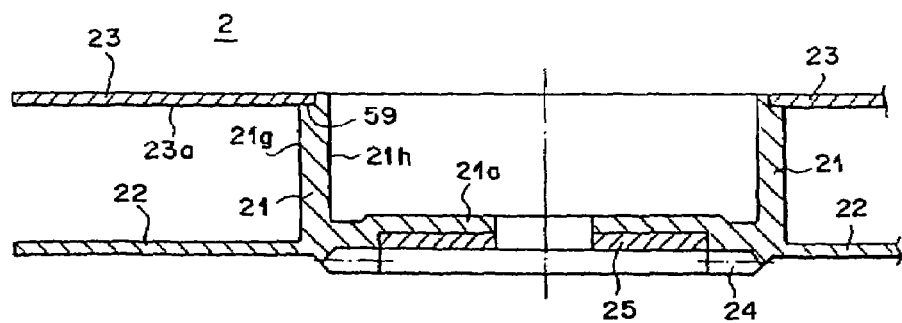
FIG. 58 is a sectional view of a reel according to a further embodiment.
Figure 59:
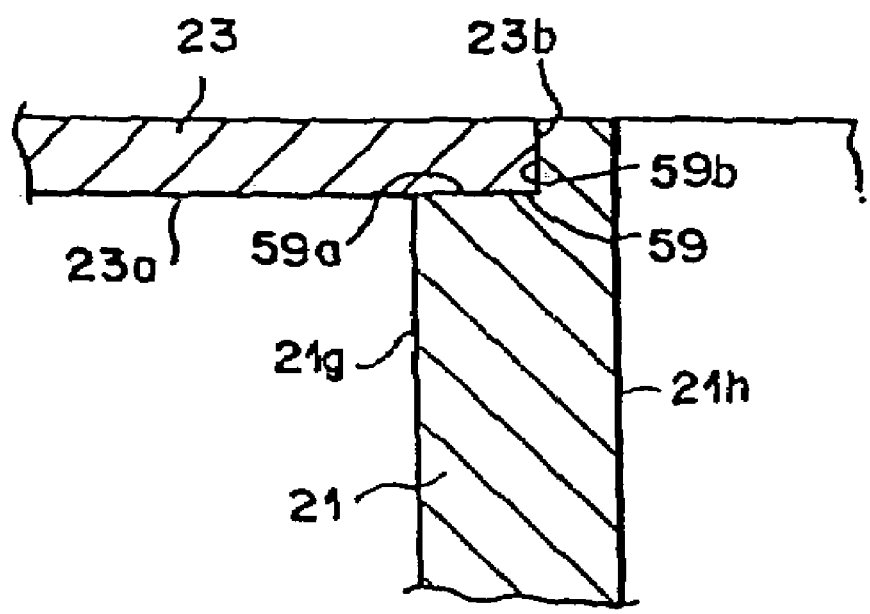
FIG. 59 is an enlarged view of the essential part of the reel of FIG. 58.

FIGS. 58 and 59 show a reel 2 according to another embodiment. This embodiment differs in the shape of the adhesion portion, and the other parts are provided in the same way as FIG. 56.

In the end surface of the reel hub 21 to which the upper flange portion 23 is rigidly attached, an annular recess 59 is formed so that a portion on the side of the outer peripheral surface 21g becomes lower in height, as shown in FIG. 59. The end surface 59a and peripheral surface 59b of this recess 59 become adhesion surfaces. On the other hand, the upper flange portion 23 is in the form of a disc with a circular opening at the central portion, and as shown in FIG. 59, the inner peripheral surface 23b and the radially inner portion of the inner flange surface 23a become adhesion surfaces.

For the adhesion between the reel hub 21 and the upper flange portion 23, an adhesive is supplied in a predetermined amount to the adhesion surface of the reel hub 21 and/or the adhesion surface of the upper flange portion 23 by supply means such as a dispenser, etc. While both are being positioned, the inner peripheral portion of the upper flange portion 23 is fitted and assembled on the recess 59 of the reel hub 21. The inner peripheral surface 23b of the upper flange portion 23 and the peripheral surface of the recess 59b of the reel hub 21 are adhered at a surface parallel to the axis of rotation of the reel hub 21, and the end surface 59a of the recess of the reel hub 21 and the radially inner portion of the flange surface 23a are adhered at a surface perpendicular to the rotation axis of the reel hub 21.

In this embodiment, as with the above-mentioned embodiment, at least one of the adhesion surfaces in the adhesion portion between the recess end surface 59a of the reel hub 21 and the radially inner flange surface 23a of the upper flange portion 23 and the adhesion portion between the recess peripheral surface 59b of the reel hub 21 and the inner peripheral surface 23b of the upper flange portion 23 is roughened as occasion demands, thereby increasing the adhesive strength of the adhesive.

According to this embodiment, as with the aforementioned embodiment, the reel hub 21 and the upper flange portion 23 are joined by an adhesive. As a consequence, the reel hub 21 and the upper flange portion 23 can be uniformly adhered over the whole periphery without giving rise to deformation in the upper flange portion 23. The deflection of the rotation of the upper flange portion 23 is small and lateral fluctuation in magnetic tape being transported is also small. Furthermore, it becomes possible to meet the high-density requirement of the magnetic tape cartridge.

In addition, high adhesive strength is obtained by joining the reel hub 21 and the upper flange portion 23 at two surfaces perpendicular to each other. Furthermore, a stepped portion may be formed in the recess 59 of the reel hub 21.

Note that in both embodiments, the adhesion surface, in addition to being provided continuously on the whole periphery, may be formed in a discontinuous shape having a partial groove partially. In this case, an excess of adhesive can be more effectively prevented from flowing in the groove and overflowing from the adhesion surface to the outside.

According to this embodiment as described above, the upper flange portion 23 in the form of a disc is rigidly attached by an adhesive to the end portion of the cylindrical reel hub 21 in which tape is wound on the outer peripheral surface 21g. As a result, the upper flange portion 23 is rigidly attached so that it is at a right angle to the rotation axis and deformation does not develop, whereby satisfactory dimensional precision can be obtained. By making the lateral deflection of wound tape smaller, even for resin molded products it becomes possible to sufficiently meet the enhanced recording density and recording precision requirements.

If a light hardening type adhesive, particularly an ultraviolet ray hardening type adhesive is used as the aforementioned adhesive, mass production and process simplification can be achieved by a reduction in the hardening time.

Furthermore, by employing an adhesive it is also possible to combine the reel hub 21 and the upper flange 23, made of resin, which can not be welded by ultrasonic welding. Also, in ultraviolet welding, the flatness of the reel hub 21 and the cylindricality of the lower flange portion 22 are reduced due to an unevenness in wall thickness between the reel hub 21 and the lower flange portion 22 integrally formed in order to assure weld surfaces, but uniform wall-thickness molding becomes possible. As a result, an enhancement in the molding precision of the reel hub 21 is achieved and the reel 2 with higher precision is obtained.

In addition, all of the contents of Japanese Patent Application Nos. 10(1998)-158784, 10(1998)-202497, 10(1998)-158786, 10(1998)-160387, 10(1998)-236935, 10(1998)-202498, 10(1998)-245308, 10(1998)-344984 and 10(1998)-217432 are incorporated into this specification by reference.

What is claimed is:

1. A magnetic tape cartridge, for rotatably housing within a cartridge case a single reel having magnetic tape wound thereon, comprising reel-rotation restraining means for allowing rotation of said reel when being used and restricting said rotation when not being used; wherein said reel-rotation restraining means has a restraining member for restricting rotation of said reel by moving toward or away from said reel, an urging member for urging said restraining member in a restraining direction, and a releasing member for moving said restraining member in a releasing direction, by rotating integrally with said reel and moving according to a chucking operation of drive-side rotation drive means;

said reel is provided with a reel gear which meshes with a driving gear of said drive-side rotation drive means, and a pushing-up portion formed in part of said releasing member is provided so that a distal end thereof can abut said-driving gear through a through hole provided in said reel gear; and said reel is formed by molding a metal reel plate by insert molding, and said reel is also formed so that outside the outer peripheral surface of said reel plate, a clearance in the form of a circumferential groove is formed between said outer peripheral surface and a bottom wall of said reel, and so that outside said clearance, said reel gear is formed.

* * * * *